United States Patent
DeVree

(10) Patent No.: US 8,666,818 B2
(45) Date of Patent: Mar. 4, 2014

(54) PROGRESS BAR IS ADVERTISEMENT

(75) Inventor: Todd DeVree, Plymouth, MI (US)

(73) Assignee: LogoBar Innovations, LLC, Canton, MI (US)

( * ) Notice: Subject to any disclaimer, the term of this patent is extended or adjusted under 35 U.S.C. 154(b) by 190 days.

(21) Appl. No.: 13/210,034

(22) Filed: Aug. 15, 2011

(65) Prior Publication Data

US 2013/0046641 A1 Feb. 21, 2013

(51) Int. Cl.
*G06Q 30/00* (2012.01)

(52) U.S. Cl.
USPC .................. 705/14.68; 705/14.69; 705/14.72; 705/14.73

(58) Field of Classification Search
USPC .................. 705/14.68, 14.69, 14.72, 14.73
See application file for complete search history.

(56) References Cited

U.S. PATENT DOCUMENTS

| | | | |
|---|---|---|---|
| 6,188,398 B1 | 2/2001 | Collins-Rector et al. |
| 6,248,946 B1 | 6/2001 | Dwek |
| 6,282,713 B1 | 8/2001 | Kitsukawa et al. |
| 6,496,857 B1 | 12/2002 | Dustin et al. |
| 6,505,169 B1 | 1/2003 | Bhagavath et al. |
| 6,859,936 B2 | 2/2005 | Makowski, Jr. et al. |
| 7,043,746 B2 | 5/2006 | Ma |
| 7,290,698 B2 | 11/2007 | Poslinski et al. |
| 7,487,529 B1 | 2/2009 | Orlick |
| 7,593,868 B2 | 9/2009 | Margiloff et al. |
| 7,647,609 B2 | 1/2010 | Wachtfogel et al. |
| 7,779,438 B2 | 8/2010 | Davies |
| 7,849,481 B2 | 12/2010 | Moon et al. |
| 7,934,170 B2 | 4/2011 | Fulcher et al. |
| 7,987,478 B2 | 7/2011 | Minor |
| 8,006,265 B2 | 8/2011 | Redling et al. |
| 8,135,620 B2 | 3/2012 | Barsade et al. |
| 8,261,300 B2 | 9/2012 | Barton et al. |
| 8,281,332 B2 | 10/2012 | Rajaraman et al. |
| 8,310,443 B1 | 11/2012 | Pan |
| 8,387,086 B2 | 2/2013 | Agarwal et al. |
| 2001/0018858 A1 | 9/2001 | Dwek |
| 2002/0120506 A1 | 8/2002 | Hagen |
| 2004/0034874 A1 | 2/2004 | Hord et al. |
| 2005/0171863 A1 | 8/2005 | Hagen |
| 2006/0013555 A1 | 1/2006 | Poslinski |
| 2006/0112341 A1 | 5/2006 | Shafron |
| 2006/0129937 A1 | 6/2006 | Shafron |
| 2006/0227108 A1 | 10/2006 | Meyer et al. |
| 2006/0253794 A1 | 11/2006 | Wilson |
| 2007/0033269 A1 | 2/2007 | Atkinson et al. |
| 2007/0112627 A1 | 5/2007 | Jacobs et al. |

(Continued)

FOREIGN PATENT DOCUMENTS

| CN | 001916897 A | 2/2007 |
|---|---|---|
| JP | 2001325522 A | 11/2001 |

(Continued)

*Primary Examiner* — Raquel Alvarez

(74) *Attorney, Agent, or Firm* — Rader, Fishman & Grauer PLLC

(57) ABSTRACT

A progress bar for a multi media device, such as a television or a computer, can depict digital media streaming or otherwise where a progress bar operates during the media playback function. One embodiment of the present invention includes the progress bar as an advertisement including company logos. The progress bar is the advertisement and is operable to morph into various positions allowing the advertisement to develop during the playing of the video. Marketers promote their logo as the progress bar to increase brand exposure.

26 Claims, 23 Drawing Sheets

(56) References Cited

U.S. PATENT DOCUMENTS

| | | |
|---|---|---|
| 2007/0143803 A1 | 6/2007 | Lim |
| 2007/0239546 A1 | 10/2007 | Blum et al. |
| 2008/0016113 A1 | 1/2008 | Theobald et al. |
| 2008/0046320 A1* | 2/2008 | Farkas et al. ............... 705/14 |
| 2008/0066107 A1 | 3/2008 | Moonka et al. |
| 2008/0183534 A1 | 7/2008 | Joo |
| 2008/0276272 A1 | 11/2008 | Rajaraman et al. |
| 2008/0288342 A1* | 11/2008 | Ingleshwar ............... 705/14 |
| 2009/0076963 A1 | 3/2009 | Worthington |
| 2009/0116817 A1 | 5/2009 | Kim et al. |
| 2009/0265611 A1 | 10/2009 | Sengamedu et al. |
| 2009/0307721 A1 | 12/2009 | Afram et al. |
| 2009/0317053 A1 | 12/2009 | Morley et al. |
| 2010/0017715 A1 | 1/2010 | Balassanian |
| 2010/0119206 A1 | 5/2010 | Craner et al. |
| 2010/0122287 A1 | 5/2010 | Beyabani et al. |
| 2010/0146419 A1 | 6/2010 | Castelli et al. |
| 2010/0162322 A1 | 6/2010 | Roberts et al. |
| 2010/0185513 A1 | 7/2010 | Anderson et al. |
| 2010/0198697 A1 | 8/2010 | Brown et al. |
| 2010/0241961 A1 | 9/2010 | Peterson et al. |
| 2011/0040626 A1 | 2/2011 | Lin |
| 2011/0072461 A1 | 3/2011 | Moon et al. |
| 2011/0082761 A1* | 4/2011 | Eglen et al. ............... 705/26.1 |
| 2011/0093780 A1* | 4/2011 | Dunn et al. ............... 715/706 |
| 2011/0161811 A1 | 6/2011 | Choi |
| 2011/0231265 A1 | 9/2011 | Brown et al. |
| 2011/0255840 A1 | 10/2011 | Bornsen |
| 2012/0026549 A1* | 2/2012 | Tanaka ............... 358/1.15 |
| 2012/0222067 A1 | 8/2012 | Barton |
| 2012/0240163 A1 | 9/2012 | Des Jardins |
| 2012/0254015 A1* | 10/2012 | Ram et al. ............... 705/37 |
| 2012/0265621 A1* | 10/2012 | Sechrist et al. ............ 705/14.73 |
| 2012/0272278 A1* | 10/2012 | Bedi ............... 725/105 |
| 2012/0304098 A1* | 11/2012 | Kuulusa ............... 715/772 |
| 2012/0307152 A1 | 12/2012 | Zaslavsky et al. |
| 2012/0320091 A1 | 12/2012 | Rajaraman et al. |
| 2012/0323732 A1 | 12/2012 | Rothman et al. |
| 2013/0024888 A1 | 1/2013 | Sivertsen |

FOREIGN PATENT DOCUMENTS

| | | |
|---|---|---|
| KR | 20010044953 A | 6/2001 |
| KR | 20020018922 A | 3/2002 |
| WO | WO-0054183 A1 | 9/2000 |

\* cited by examiner

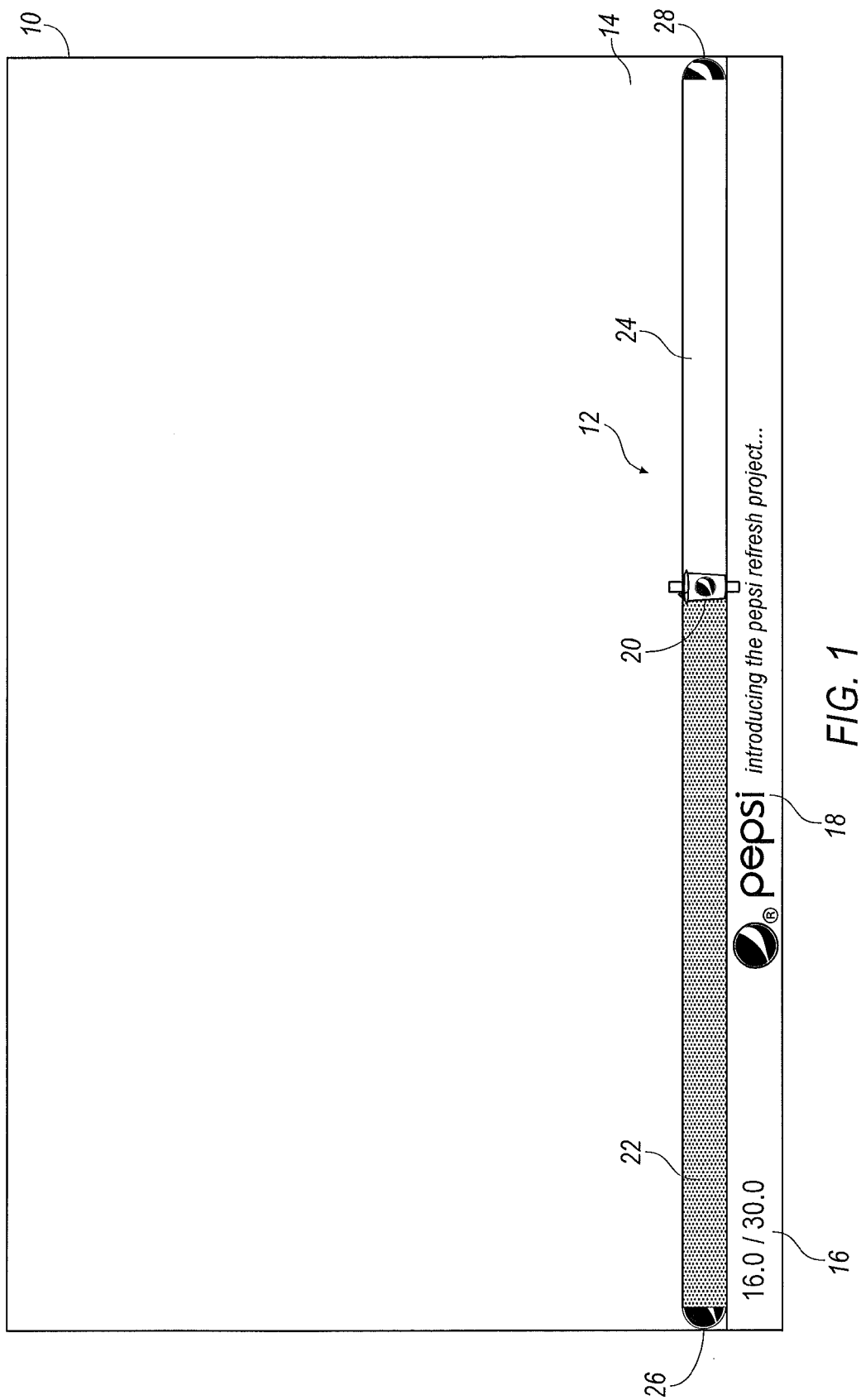

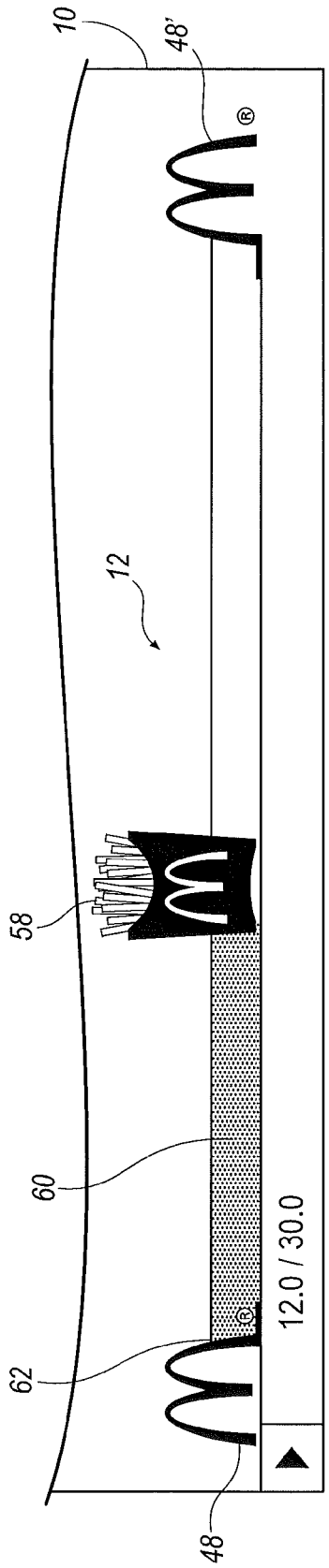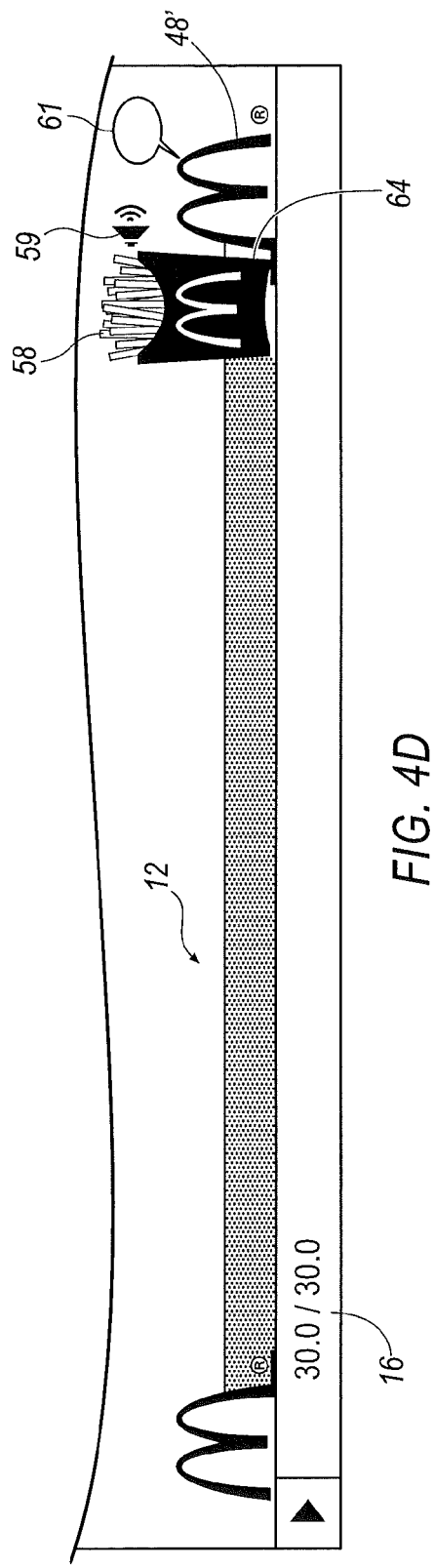

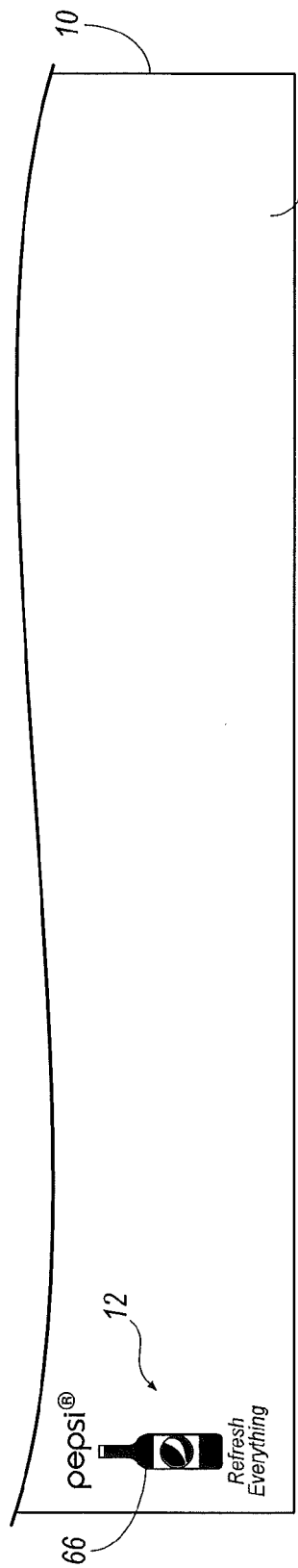
FIG. 5A  program begins
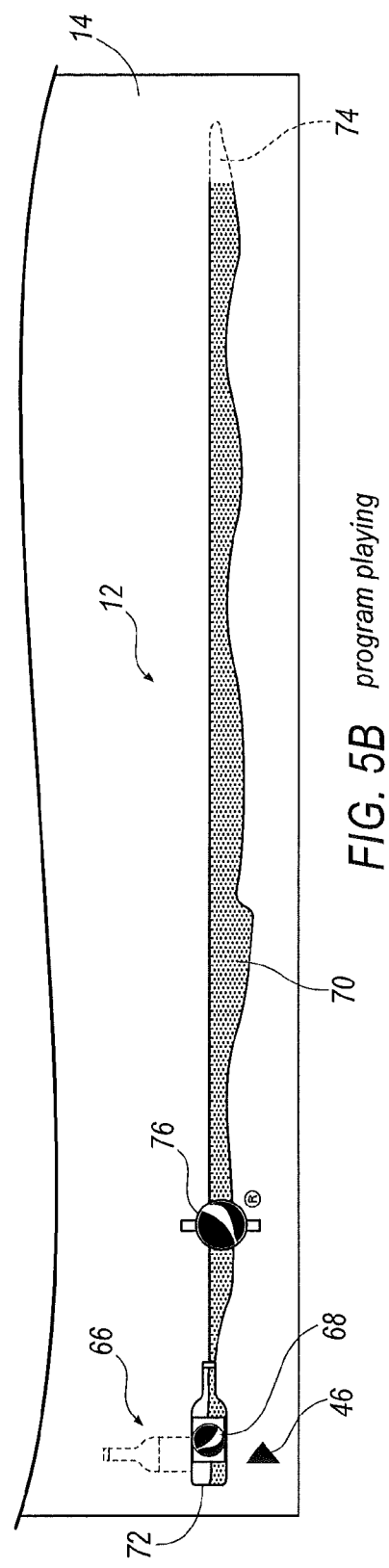
FIG. 5B  program playing

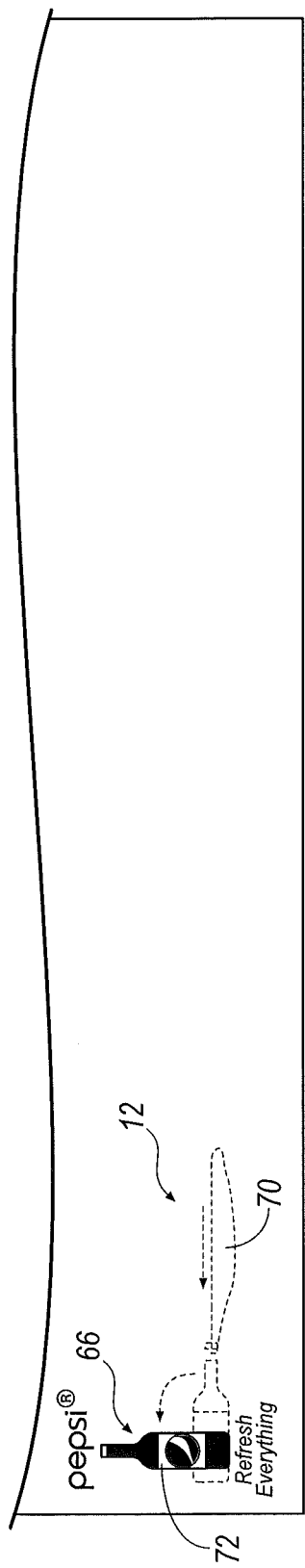
FIG. 5C  program ends

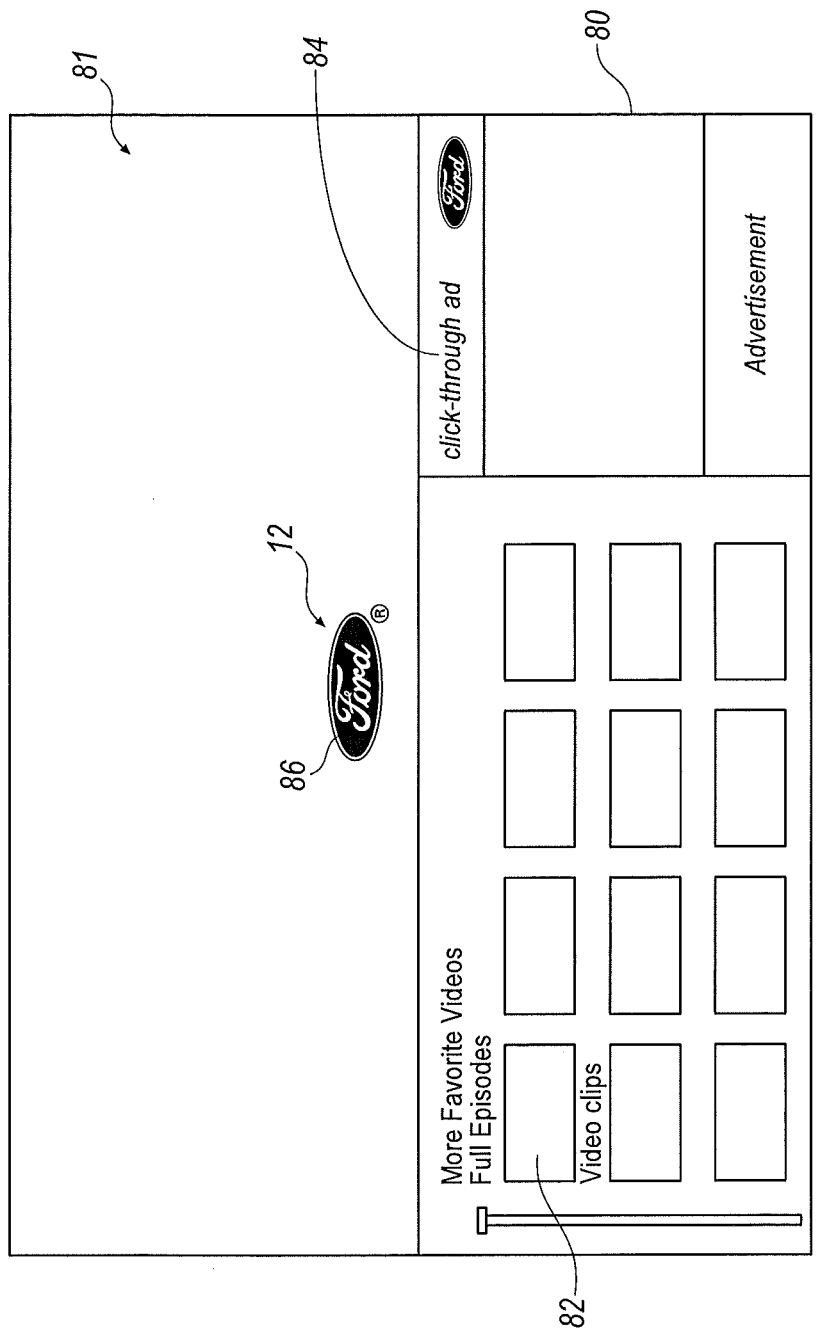
FIG. 6A  Loading

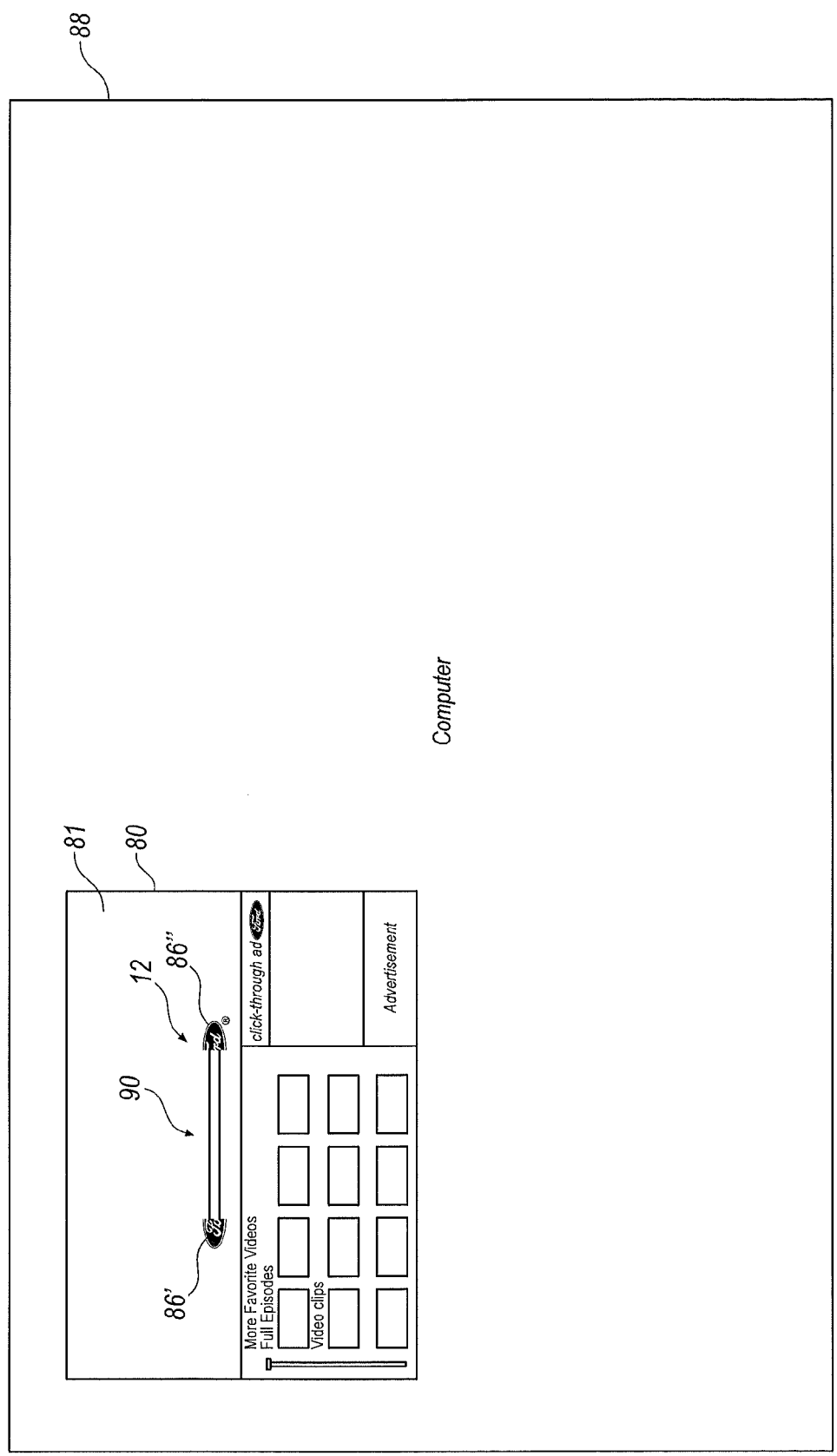
FIG. 6B Morphing

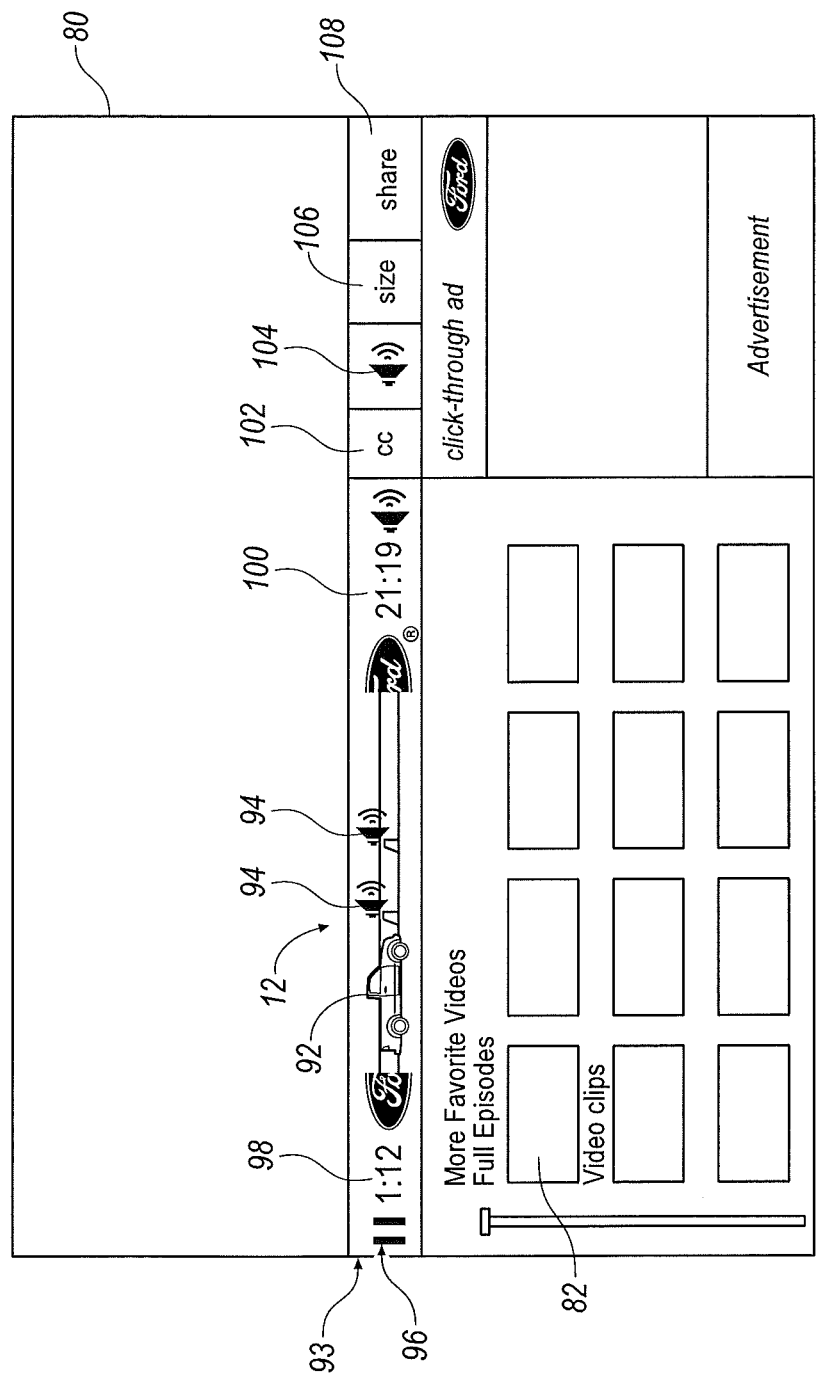
FIG. 6C  Play Mode

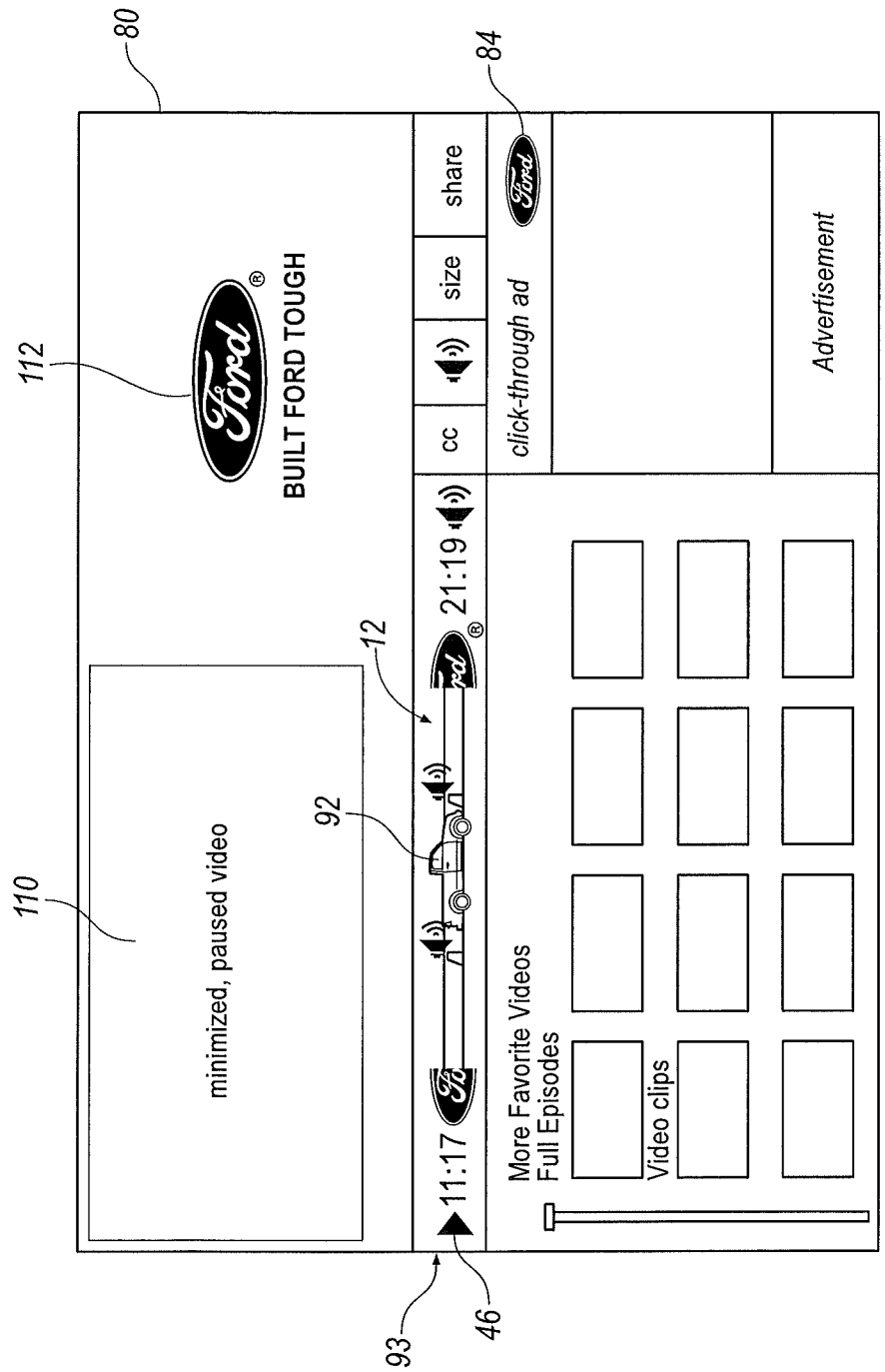
FIG. 6D Pause

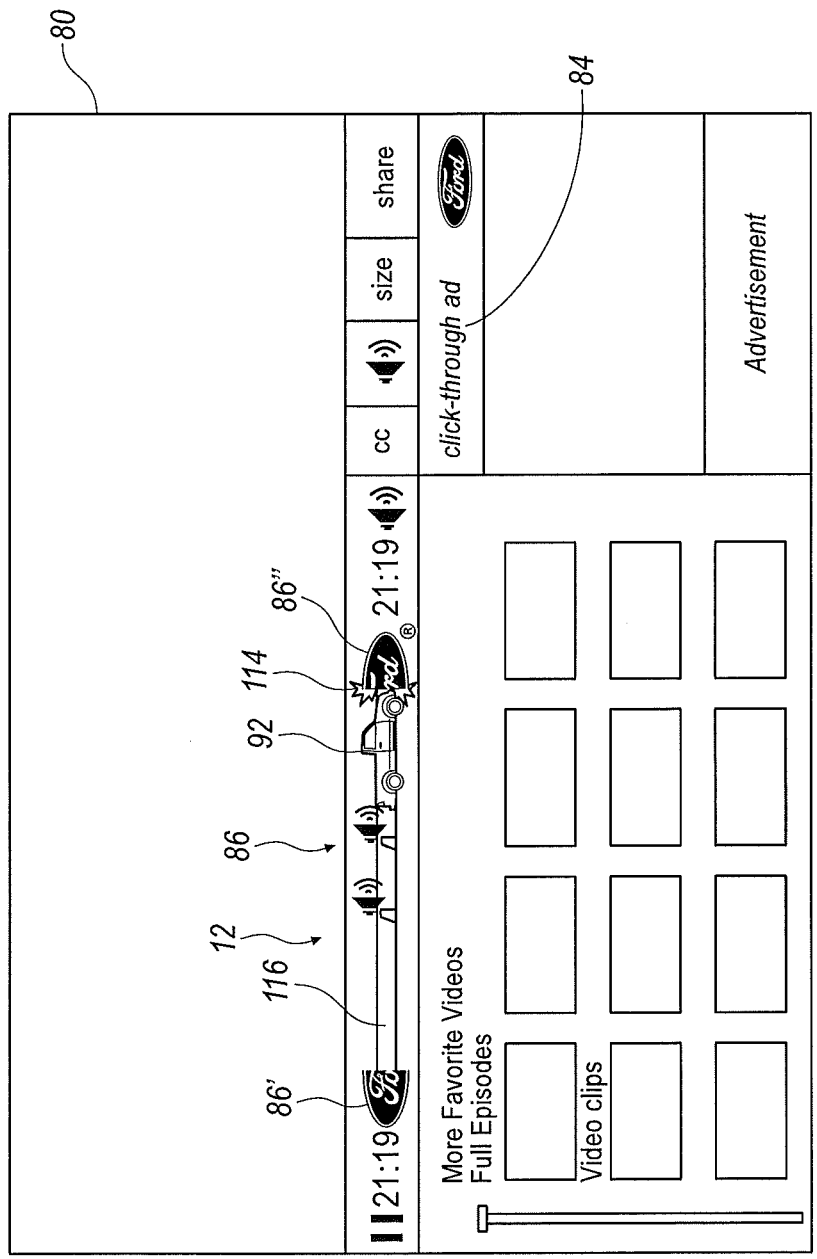
FIG. 6E *Video Ends*

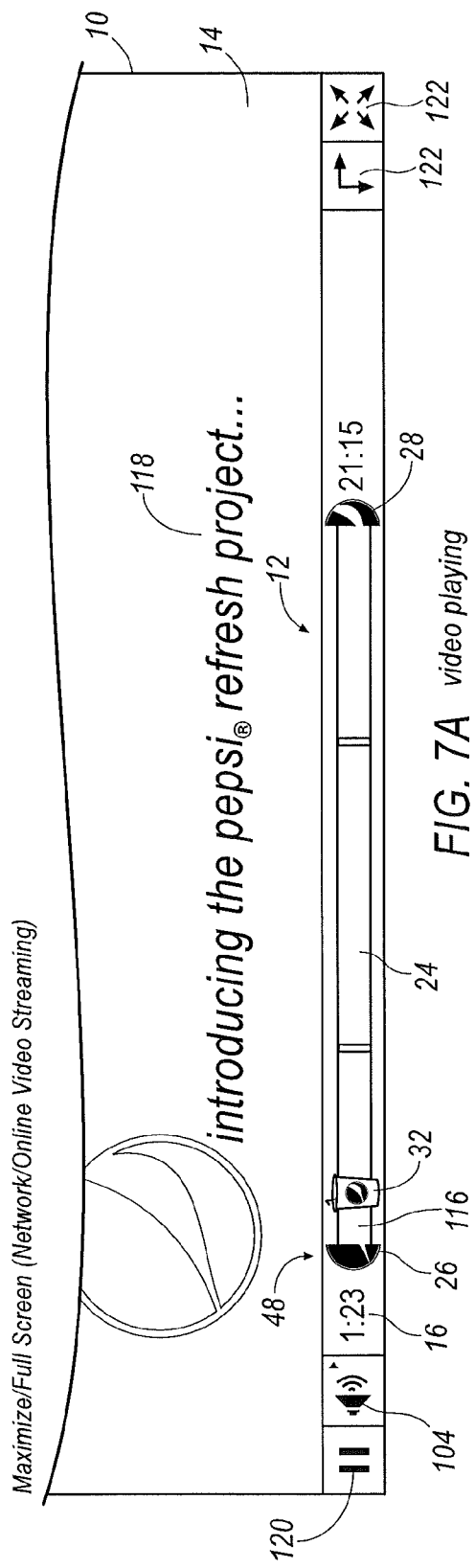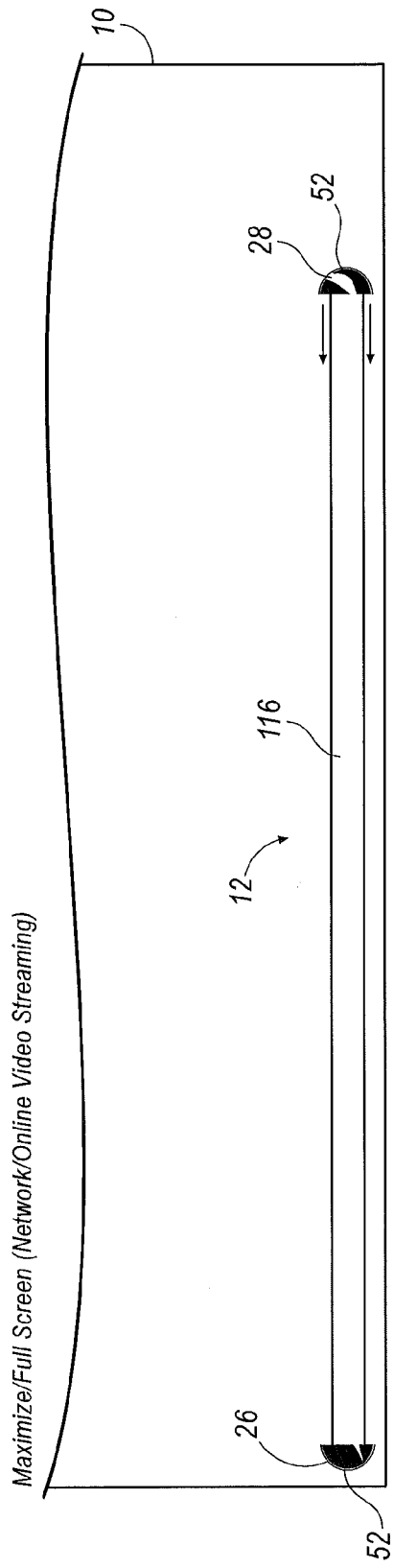
FIG. 7A  video playing
FIG. 7B  video playing done

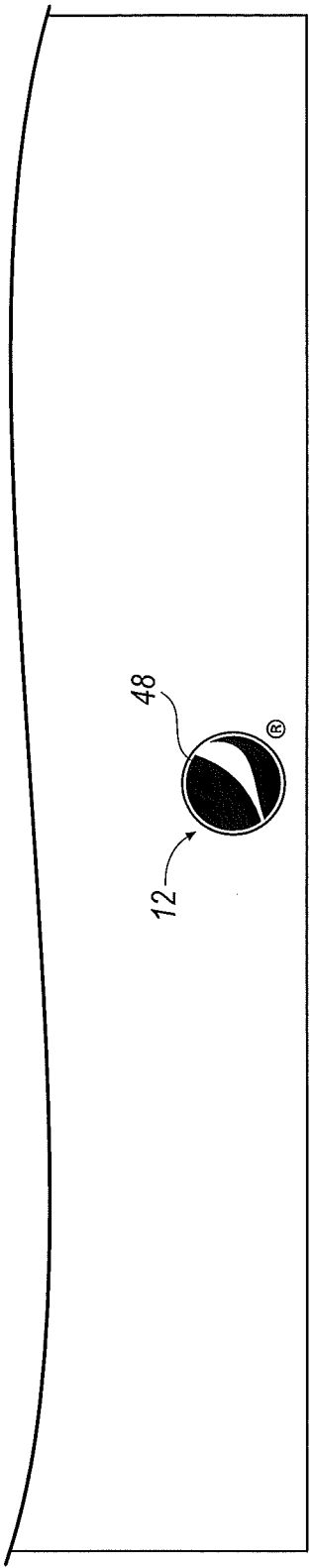
FIG. 7C video playing
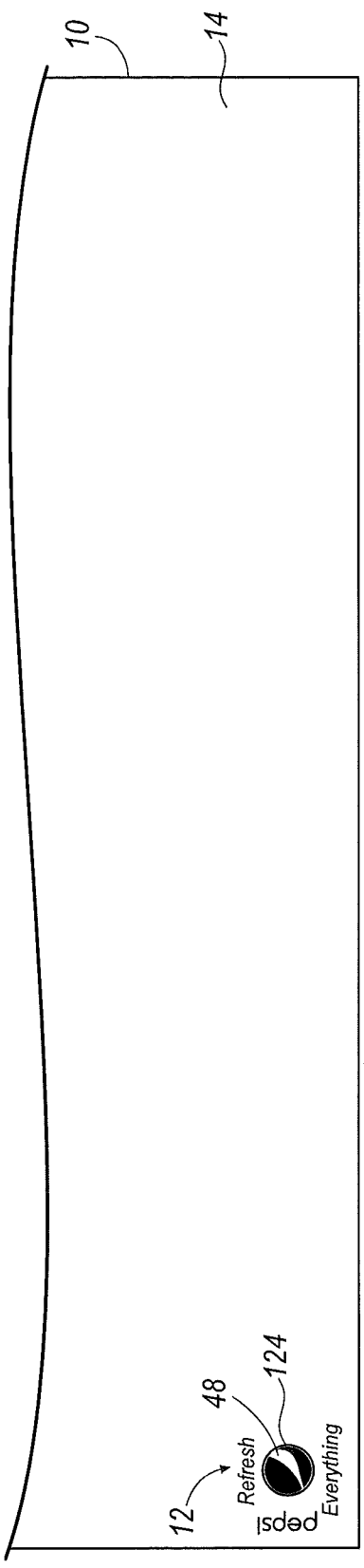
FIG. 7D reset

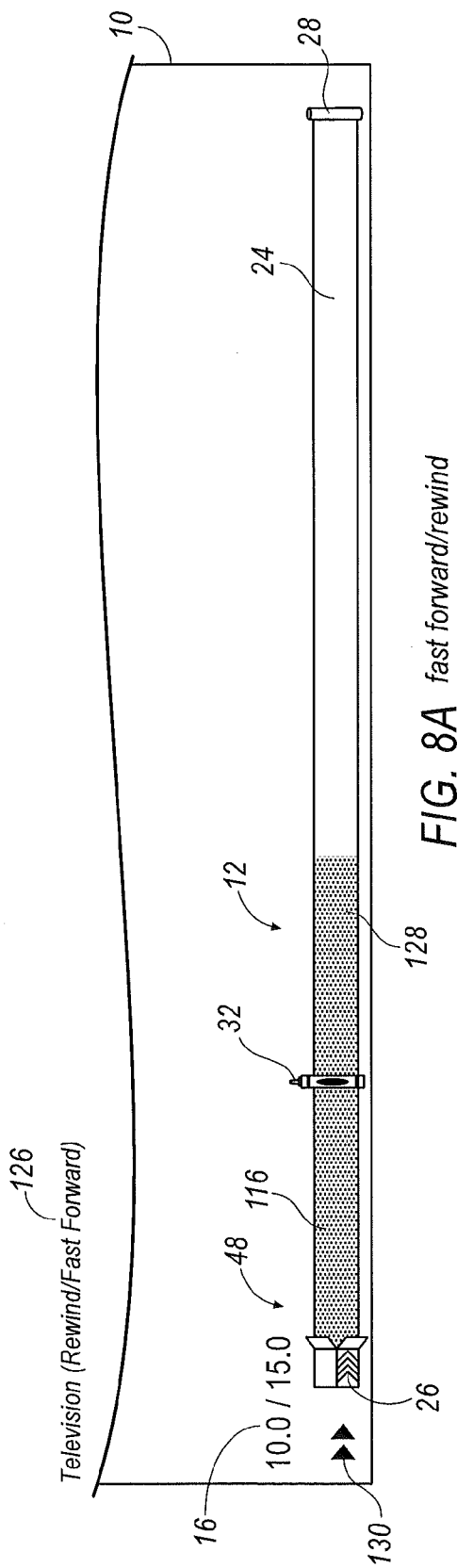
FIG. 8A  fast forward/rewind
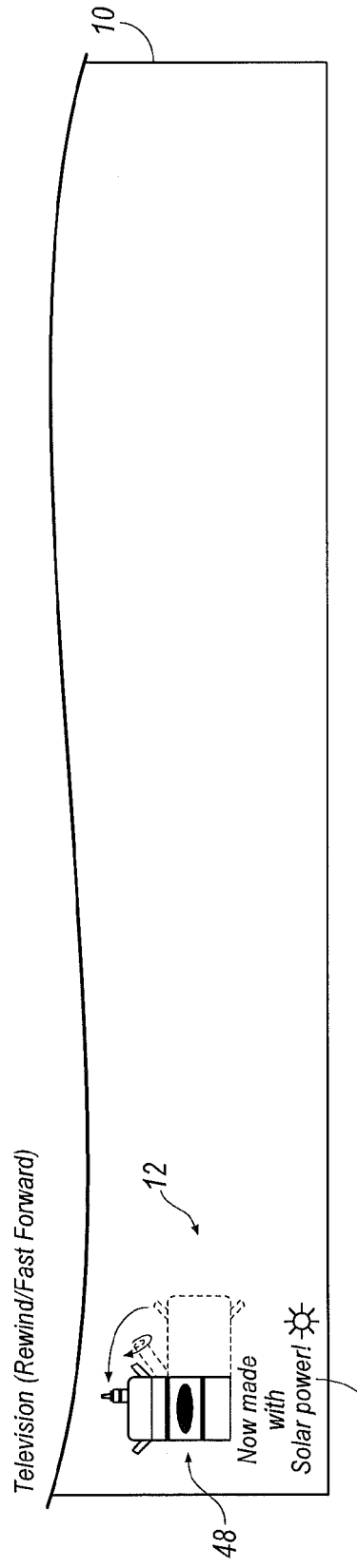
FIG. 8B  resume program at normal speed

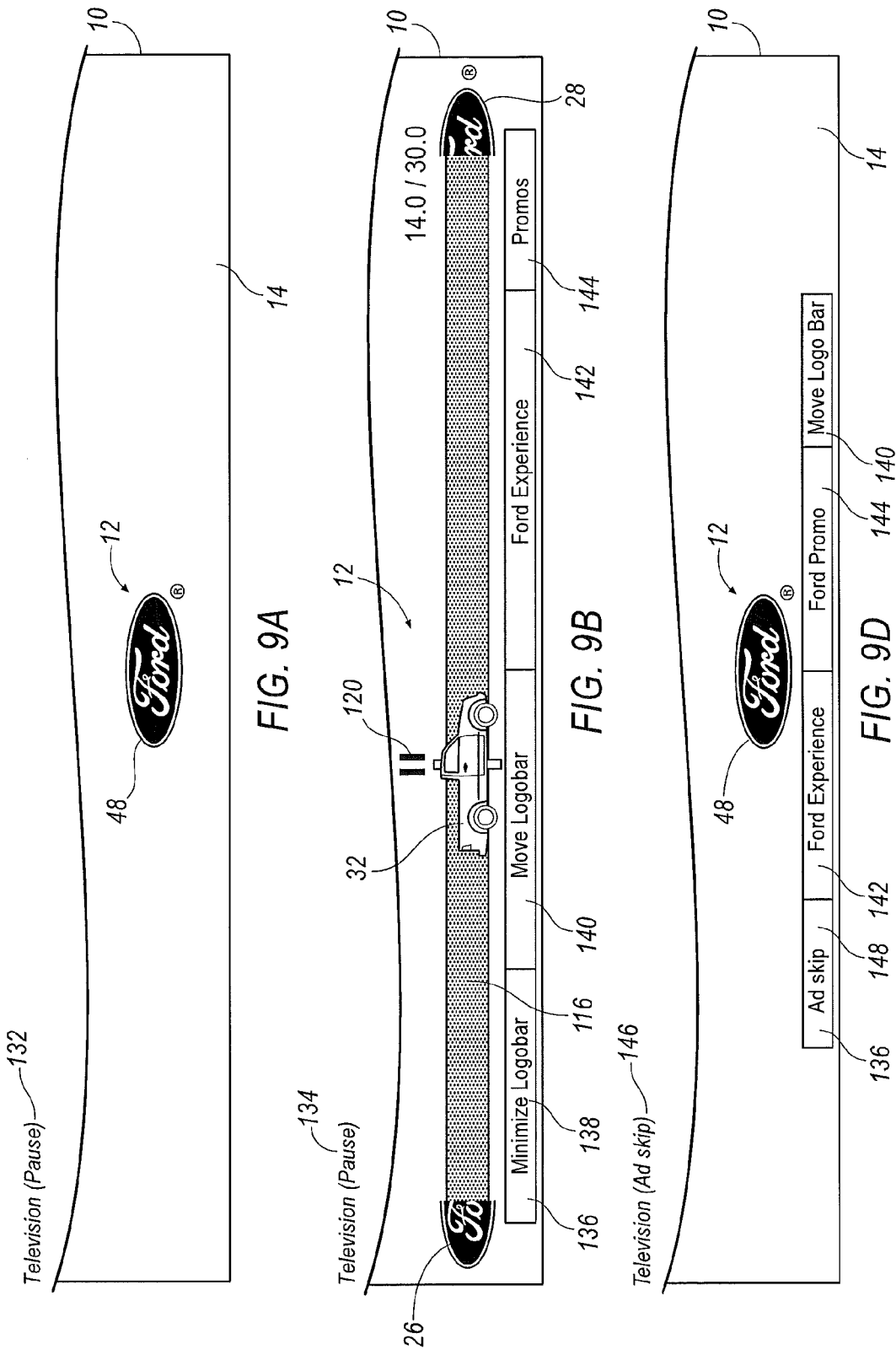

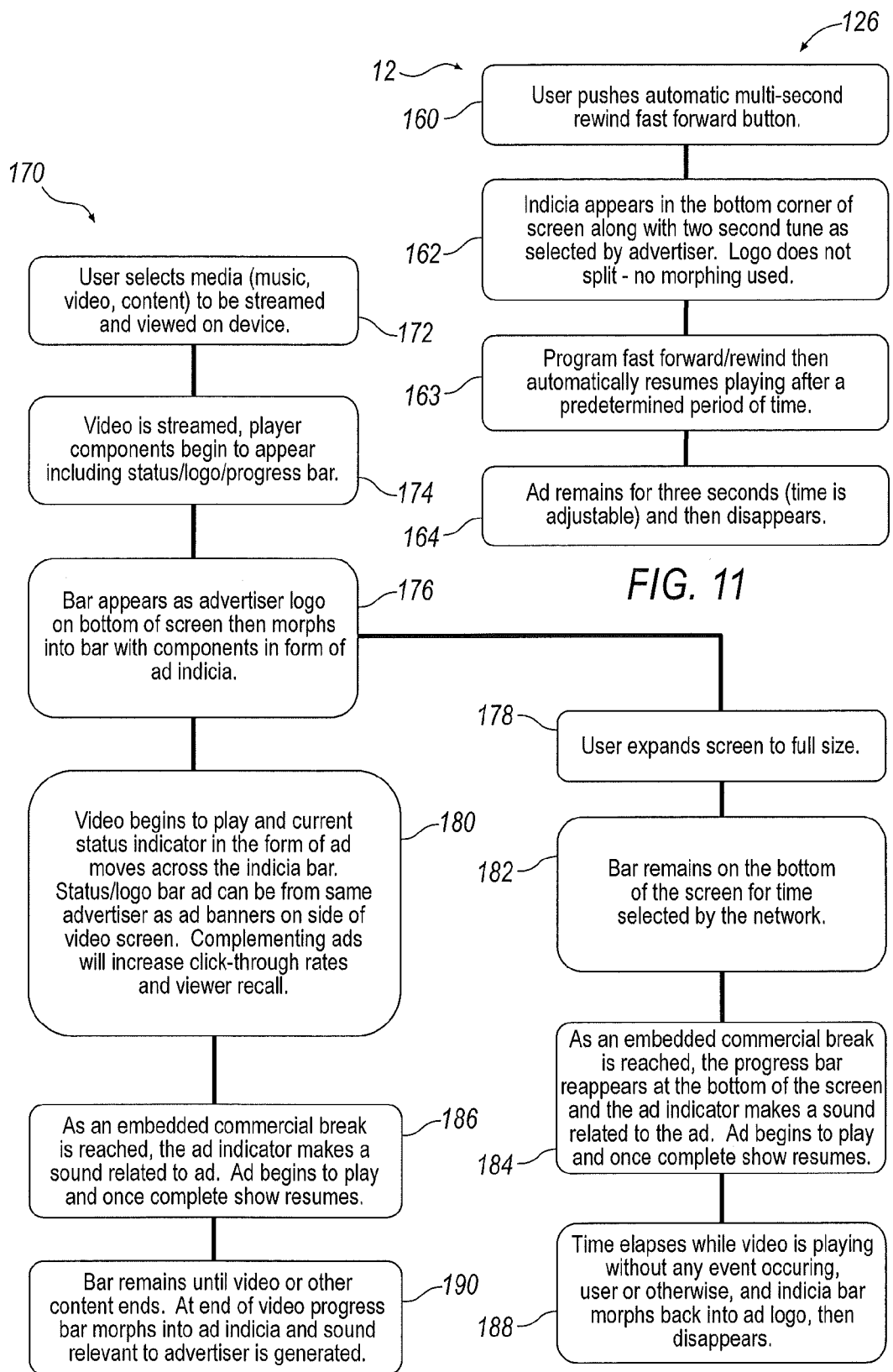

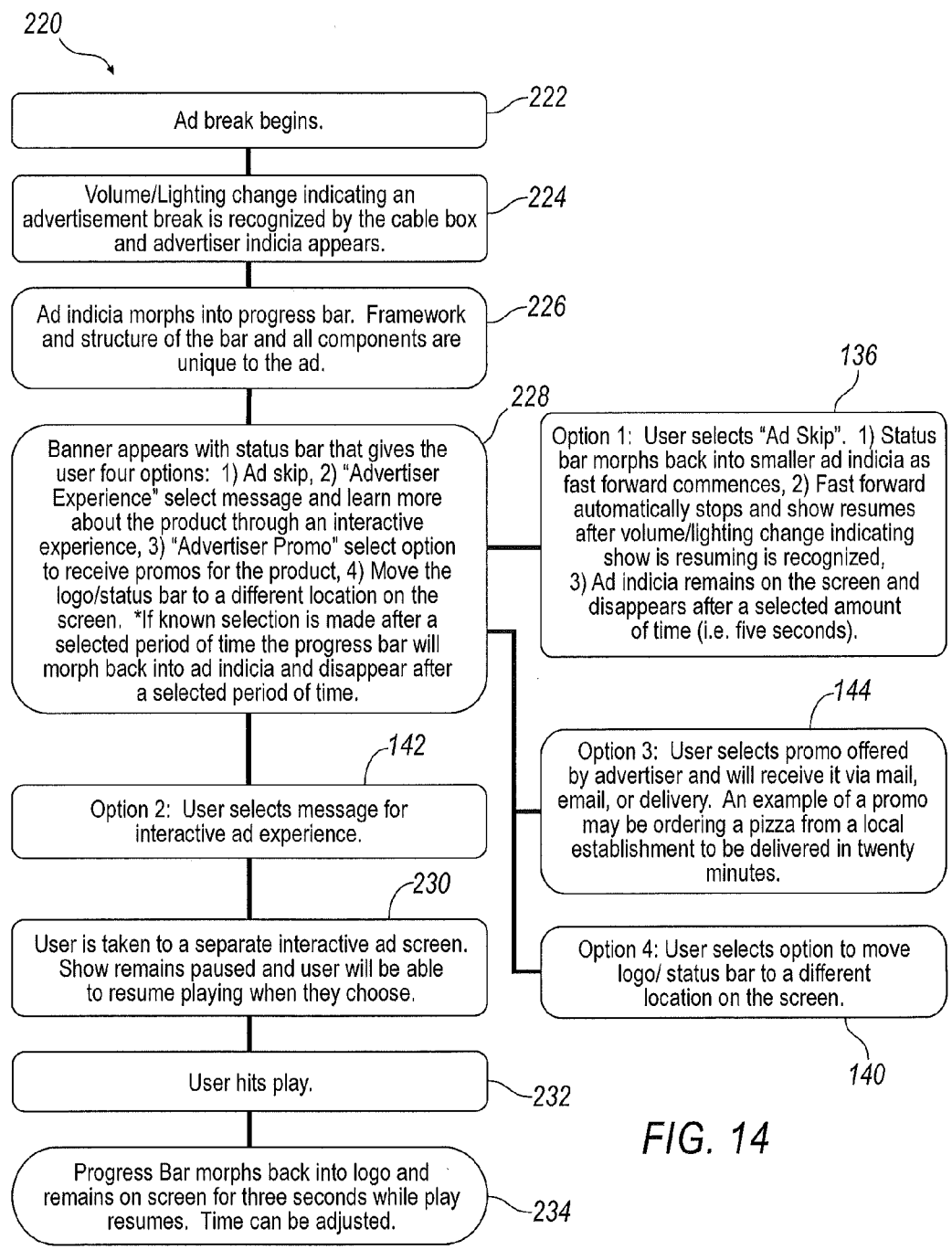

PROGRESS BAR IS ADVERTISEMENT

BACKGROUND OF THE INVENTION

Advertising on the internet and on television or through other media provides a means for generating revenues for the networks and sales and brand exposure for companies providing a product and/or service. Television networks garner revenue from companies that advertise during their commercial breaks. On the internet revenue is raised by the networks and others that stream video in a variety of ways. Advertising pop-up banners and commercial breaks embedded in programs have been used extensively so as to provide brand exposure as consumers surf the internet and view and/or listen to streamed media. However, pop-ups are often ignored or quickly dismissed by the users because they interfere with the user's experience.

Additionally, the use of Digital Video Recorders is growing in households across the US and every year more and more people are recording their favorite television shows and watching them at a time for them which is convenient. This phenomenon has been labeled "Timeshifting" by the industry and the Nielson Reports have even adjusted their ratings to reflect timeshifting. This causes a problem for advertisers because their commercials are being skipped over as users fast forward through them. Another problem for advertisers is that other than through surveys, there is no way to measure how many people are actually watching their ads during live television or "timeshifted" viewing.

It has become popular for major networks such as ABC, CBS, NBC, CNN, Fox News, etc. to broadcast its programs via the internet either live or through video on-demand which provides the ability to playback recorded shows at the consumer's convenience. The loading, playing, fast forwarding, rewinding, etc. are typically controlled by pushing buttons on the tool bar. The tool bars typically appear on the lower portion of a video player or computer screen if a consumer is watching streaming video on-line. Included within the tool bar is a progress bar that indicates a user's current location in the playback. It also indicates with various symbols what mode a user is currently in. i.e. fast forward, rewind, play, pause. On any output device, the tool bar is used to control streaming media that may be delivered in various formats.

Digital Video Recorders implement a progress bar during the fast forward, rewind, pause and play modes. This progress bar uses arrows to display the current mode being used and an indicator to display the current location within the recorded show. Each manufacturer has its own progress bar format, but currently the purpose of the progress bar design is strictly targeting playback mode functions.

It would be desirable to provide an improved progress bar that is an advertisement for use with streaming media. This progress bar that is an advertisement will provide a method of generating revenue for the networks and give the advertiser the ability to know with 100% certainty that the user is viewing their ad because they are engaged with the progress bar while it is in use. This level of certainty can be obtained because an action by the user is required to initiate the viewing of the progress bar, therefore they are actively engaged. It would also be desirable to provide a method for a consumer to interact with the progress bar that is an advertisement that allows them to gain more information about a product.

According to one aspect of the invention, a progress bar for use with a streaming media device, includes advertising indicia that has the appearance of a source of a product, service or company logo. The advertising indicia forms part or all of the progress bar. A progress indicator in the form of an advertisement is operable to inform a consumer the status of play for media content. According to another aspect of the present invention, an advertising system is provided for increasing brand exposure. The system includes a display, a progress bar depicted on the display, a progress bar that is a company logo or advertisement, and a media source providing an input signal to the display.

BRIEF DESCRIPTION OF THE DRAWINGS

The present invention is illustrated by way of example and is not limited to the Figures in which similar references indicate similar elements.

FIG. 1 shows a progress bar as an advertisement where the components of a progress bar are in the form of a logo, in accordance with one embodiment of the present invention;

FIG. 4C shows a media device having a progress bar after having morphed from a company logo into a logo that is the progress bar, showing the media function in a play mode and a company's symbol progressing along a bar;

FIG. 4D shows a media device having a progress bar in a finished play state where the advertiser's logo has traversed to the end of the progress bar;

FIG. 5A shows the progress bar as an advertiser's logo prior to morphing into a fully functional progress bar, in accordance with yet an additional embodiment of the present invention;

FIG. 5B shows a progress bar that is an advertisement after it has morphed from being a company logo, icon or advertisement, wherein a liquid has spilled to form the boundaries of the bar and a logo moves in accordance with media playing;

FIG. 5C shows a progress bar at the program end state and demonstrates how the progress bar advertisement will morph back into an advertisers logo, icon or advertisement;

FIG. 6A shows a progress bar as an advertisement before it reconfigures into a fully functional progress bar and as it would be seen on a computer screen by a consumer via the internet, in accordance with another embodiment of the present invention;

FIG. 6B shows a progress bar depicted on an internet screen, where the progress bar is a Ford logo advertisement shown in the morphing stage prior to the program beginning and while the content is loading;

FIG. 6C shows the progress bar in the play mode on an internet application;

FIG. 6D shows a progress bar in the pause mode in an internet application;

FIG. 6E shows a progress bar at a state when a video ends for an internet application;

FIG. 7A shows a progress bar as an advertisement for a network online video streaming application in full screen mode;

FIG. 7B shows a progress bar in the process of morphing from a fully operational progress bar that is an advertisement into a company logo;

FIG. 7C shows a progress bar made of an advertisement, during the full screen video playing mode after the progress bar morphed and reconfigured into a company log, icon or advertisement;

FIG. 7D shows a progress bar as an advertisement, after it morphed back into a logo and slid to the side of the screen after either enough time elapsed without the user taking any action and it was time for the progress bar to disappear or the video has ended;

FIG. 8A shows a progress bar as an advertisement when in the fast forward or rewind program function mode;

FIG. 8B shows the progress bar in the resume program function mode in the process of morphing into an advertisement;

FIG. 9A shows a progress bar as a Ford logo, in the pause function mode. Once a user initiates the pause mode the first thing they would see is the advertiser's logo;

FIG. 9B shows a progress bar after it has morphed from just a logo into a progress bar that is an advertisement, showing pull down options a consumer can select, while in the pause function;

FIG. 9D shows a progress bar with its pull down options, in the advertising skip mode;

FIG. 10 shows a schematic diagram where a progress bar is an advertisement on a media device, wherein the media device is in communication with a media source such as a television, a computer, a cable box, or the like;

FIG. 11 shows a flow chart of a progress bar as an advertisement, when in the automatic pre-selected amount of time (i.e. 7 or 10 seconds) fast forward/rewind function mode;

FIG. 12 shows a flow chart of the steps for the method of a progress bar operating as an advertisement;

FIG. 14 shows a flow chart of the method of a progress bar operating an ad skip function.

DETAILED DESCRIPTION OF THE INVENTION

Figure 2A:
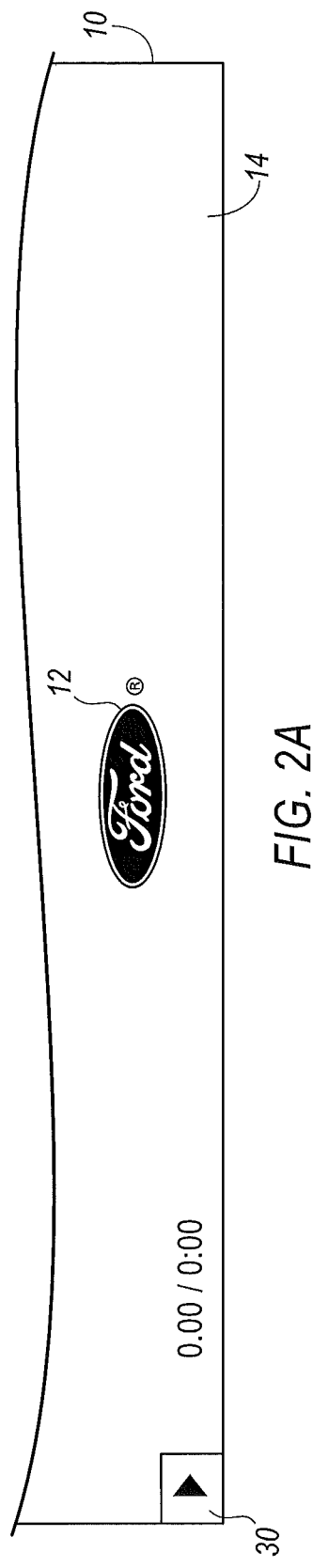
FIG. 2A shows a progress bar that is formed of an advertisement, prior to media playing, in accordance with a television screen with an embodiment of the present invention.

Embodiments of the present invention provide, amongst other things, a progress bar as an advertisement that can be used where streaming video or audio is played. It will be appreciated that the streaming media could be over the internet where, for example, movies are transmitted over the internet to a consumer's laptop computer, television, or other output device. Likewise, television shows can be broadcast through a cable box to the television where the progress bar is illustrated on the television screen. In both of these examples, the present invention contemplates the progress bar being an advertisement as a logo, brand symbol, indicia, icon, name or the like, hereinafter "logo". The logo can change, modify, reconfigure, morph, and be transformed into various aspects of a progress bar. Use of the logo increases brand exposure and is meant to enhance revenue for the brand owner.

In the following description, for purposes of explanation, various details are set forth in order to provide a thorough understanding of the description of the present inventions. It will be appreciated, however, to one skilled in the art that the inventions can be practiced without these specific details. Various embodiments of the present inventions are disclosed including methods of operation as well as the novel progress bar as an advertisement.

FIG. 1 illustrates a progress bar that is an advertiser's logo in connection with a tag line for a product. A television or other media device 10 is depicted with a progress bar 12 being positioned at the lower portion of the television screen 14. Associated with the progress bar 12 can be a time indicator 16 and an advertising indicia 18. The time indicator 16 depicts the time lapsed as compared to the ending time of the media event that is under play. This allows consumers to appreciate the time left to observe the current video or media event that happens to be playing. The advertising indicia 18 can be a visual or statement an advertiser would like to relay to the consumer about its particular products or services. The brands and slogans depicted herein are examples only and are not meant to limit the present invention. It will be appreciated that the present invention can be used with various products, brands and services.

The progress bar 12 is shown in a play mode and includes a logo on a beverage cup 20, a shaded portion 22 indicating what has played thus far, an un-played portion 24, a first portion 26 and second portion 28 of a split logo. It will be appreciated that the beverage cup 20 could represent another marketing device and the progress bar 12 may have other components that collectively comprise an interactive, morphable, tool to be used for marketing purposes. For purposes herein, media event includes digital streaming content.

FIG. 2A is a partial view of another embodiment of the present invention and illustrates an alternative progress bar 12 which is a brand depicted on the lower portion of a television screen 14. It will be appreciated that the progress bar 12 is not limited to the logo depicted, but can be other logos, marketing indicia, or the like. This embodiment depicts the progress bar as it would first be encountered by the consumer after they have selected an event that would initiate the appearance of a progress bar. This event may be, but is not limited to, play, pause, fast forward, rewind, program loading, etc. This embodiment depicts the progress bar prior to morphing into a fully functional progress bar.

Figure 2B:
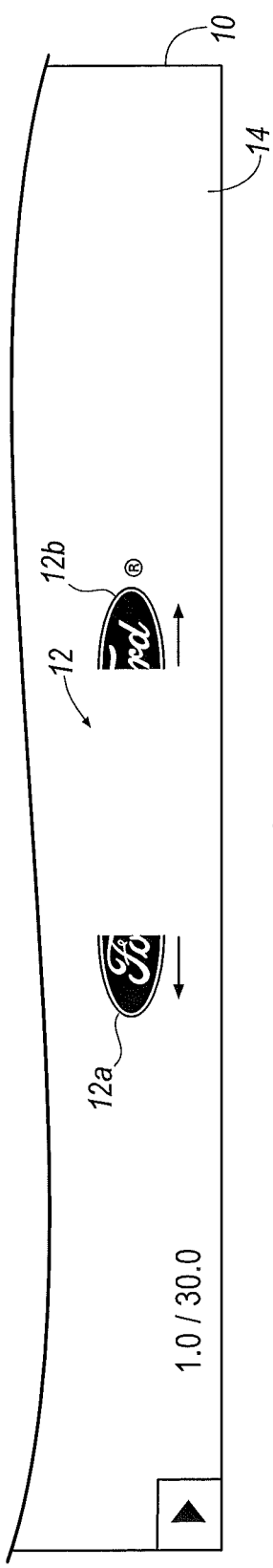
FIG. 2B shows a television screen with a progress bar progressing (morphing/reconfiguring) to a next step where media begins to play.
Figure 2C:
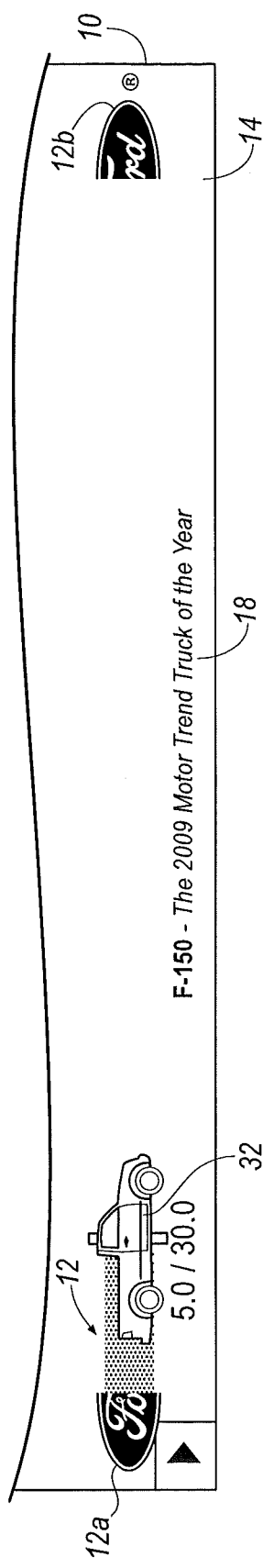
FIG. 2C shows a television screen with a progress bar where the advertising logo has split and becomes a fully functional progress bar that is an advertisement, while the digital media has begun to play.

FIG. 2B illustrates the progress bar 12 morphing and splitting into bar portions 12a and 12b such that they move in opposite directions and become a status bar. (See arrows) The bar portions 12a and 12b will continue to move in their opposite directions to the far ends of the progress bar 12 until they have reached their outer limits, at which time they have become a fully operational progress bar. FIG. 2C illustrates the configuration of the progress bar 12 once the user initiated event begins, i.e. fast forward, rewind, pause, etc. The progress bar 12 further includes a component that is a current location indicator 32 and informs the user of their current position in the video or program. The current location indicator progresses forward or backward as the video is playing, fast forwarding, or rewinding. The framework and structure of this current location indicator 32 is designed to make it an advertisement in and of itself. The progress bar 12 and all of its components including but not limited to the current location indicator 32 are designed and structured to be an advertisement. The visual device 32 can have some association with the logo, in this instance, the Ford symbol. The visual device 32 will continue to traverse to the right until it reaches the end or another instruction is provided. Advertising indicia 18, for example "The 2009 Motor Trend Truck of the Year" may be provided so as to provide yet additional advertising opportunities for the marketing entrepreneur.

Figure 2D:
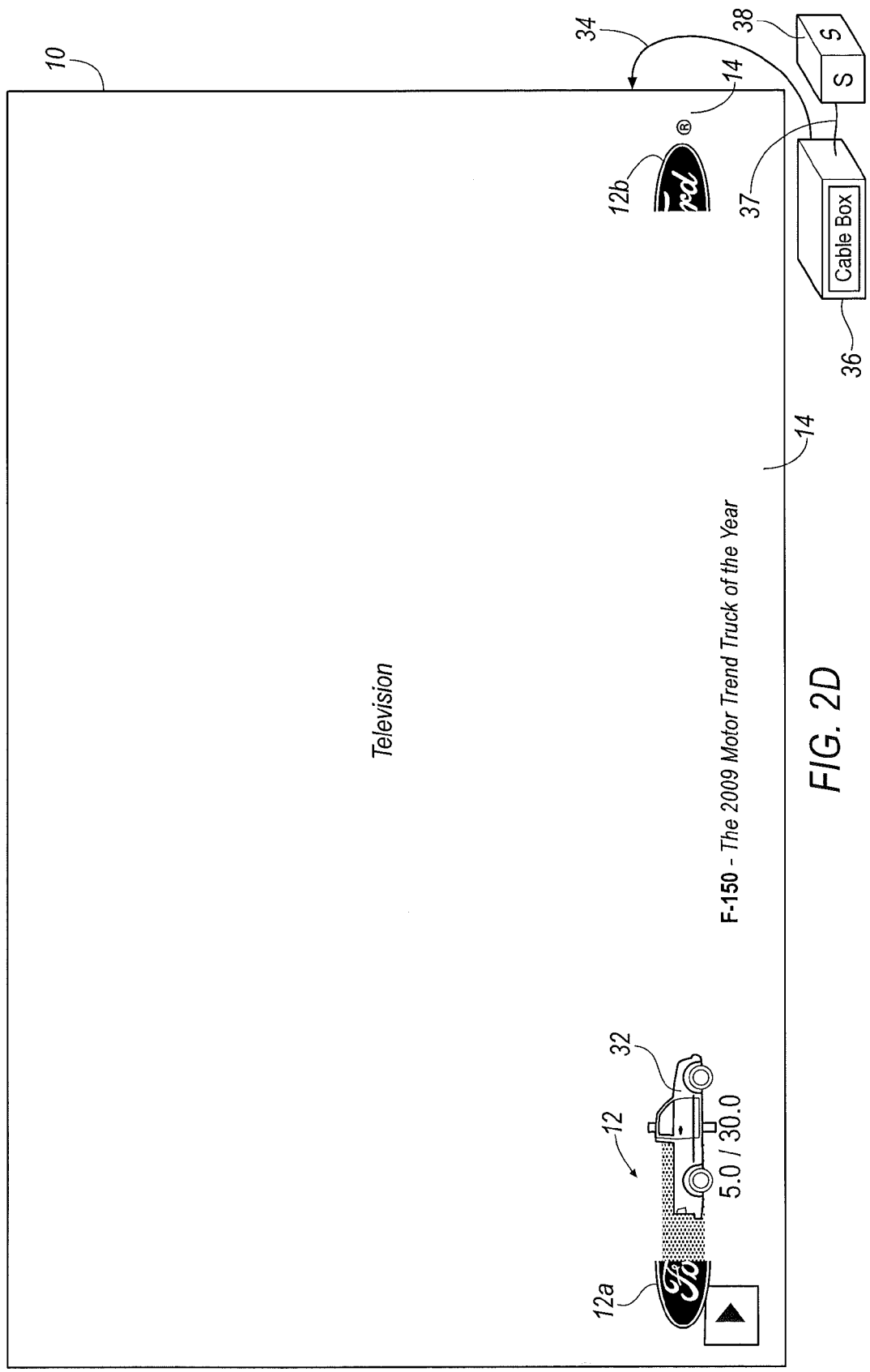
FIG. 2D shows a variation of the FIG. 2C embodiment, showing the television connected to a cable box which delivers signals to the television.

FIG. 2D illustrates the progress bar 12 being located at a lower position on a television screen 14. The television 10 is operable to receive signals 34 from a cable box 36. The cable box 36 is operable to receive signals 37 from an exterior source 38 such as cable, satellite, or other means. The cable box 36 is operable to provide live streaming content, such as TV or video on demand, or previously recorded content. That streaming content is then delivered to the television 10 where the progress bar 12 changes and the current location indicator 32 advances across the screen. It will be further appreciated that the present invention contemplates being used during live television shows, where playback features of a currently running show can be operated. Thus, wherever a progress bar can be utilized with media content, the present invention could be employed.

Figure 3:
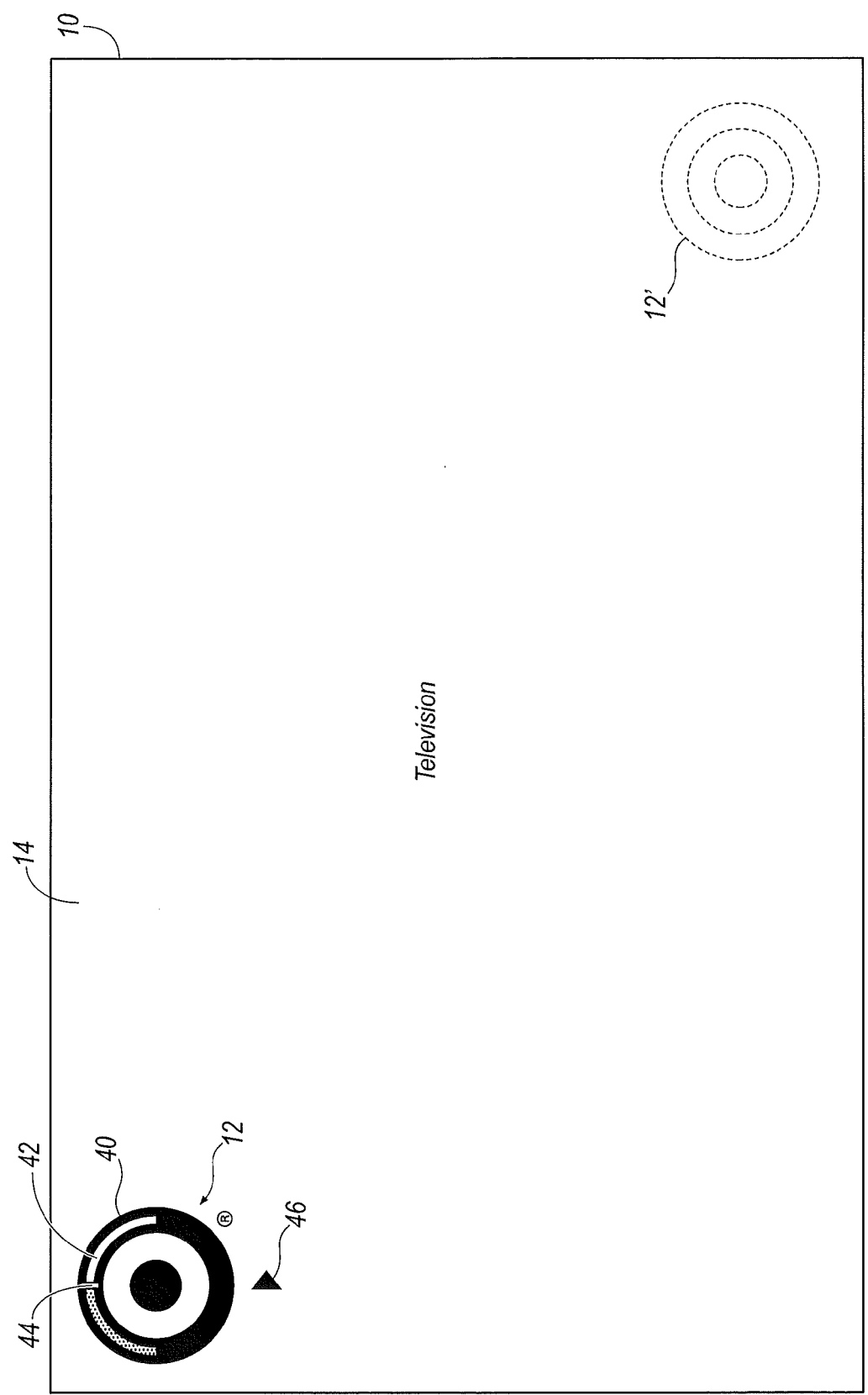
FIG. 3 shows a television screen, or other media device, having a circular-shaped progress bar as an advertisement, in accordance with yet another embodiment of the present invention.

FIG. 3 is another variation of the present invention where a progress bar 12 is shown on a television screen 14 but this time it is shown in the upper left hand corner of the television screen. It will be appreciated that the progress bar 12 can be placed in various locations around the screen, including an alternative location shown at 12'. The progress bar 12 this time is configured to be an advertisement for another company and is designed to be similar to the brand logo of that company. In this instance it's a circular target shaped configuration 40. Within the configuration 40, is a hollowed arc 42 which provides a screen for the consumer to see the progress of the media event as it is being played. The shaded portion of the arc 42 indicates the amount of the program that has been recorded and the progress indicator 44 illustrates that the movie that is being played is approximately half completed. A play tab 46 is provided to allow the consumer to know that the program is in play mode. The other controls, not shown, allow the consumer to perform the typical fast forward, pause, etc., functions. It will be appreciated that said functions may be incorporated within the progress bar 12.

Figure 4A:
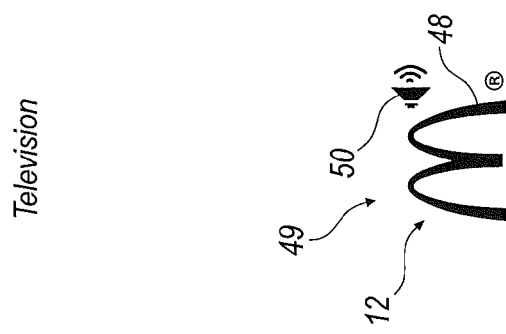
FIG. 4A shows a media device having a progress bar as the advertisement, prior to the media being played and before it has reconfigured into a fully functioning progress bar, in accordance with another embodiment of the present invention.

FIG. 4A illustrates yet another embodiment of the present invention where the progress bar 12 includes a logo 48 and an optional sound component 50. The sound component 50 could be a famous jingle that is associated with the source of the logo 48. Thus, a consumer when experiencing the present invention, could also experience a progress bar 12 that includes both a visual advertisement and an audio advertisement. A combined visual and audio advertisement 49 is presented that is the progress bar 12 and can be enjoyed by a consumer while enhancing brand exposure for an advertiser. The progress bar in this figure is shown in a static mode ready for deployment.

Figure 4B:
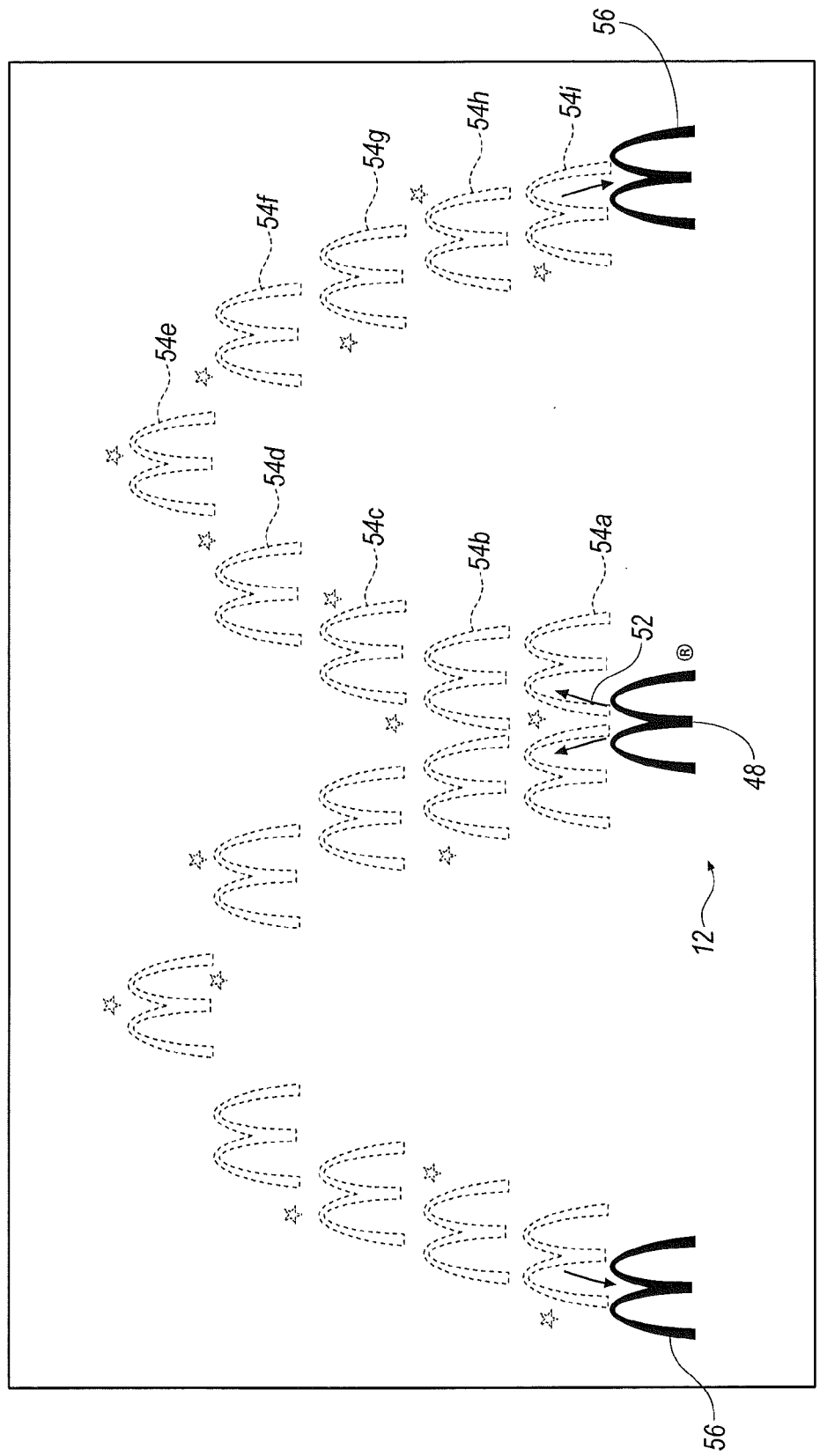
FIG. 4B shows a media device having a progress bar morphing from a first position, to second positions to begin to show new boundaries of the progress bar.

FIG. 4B illustrates a morphing step or process of a progress bar 12. During the morphing step, the logo 48 transforms into additional components of the progress bar 12 where the outer ends of the progress bar 12 are re-defined. The steps 52a-52i of the morphing process are shown in phantom where a phantom logo moves in the direction of arrows 52 to several positions starting with position 54a and continues through position 54i. A consumer may visually observe this morphing process where the logo 48 transforms into alternative positions until it reaches ends 56. It will be appreciated that the morphing process may include transforming a logo 48 into various shapes, paths, etc.

FIG. 4C illustrates the next step after the progress bar 12 has been transformed with logos defining its outer ends. The progress bar 12 is shown on the lower portion of the television 10 during a play mode. The shaded portion 60 shows how much of the show has been recorded and the progress indicator 58 shows the user's current location. The progress indicator 58 initially started at the beginning 62 where a logo defines the outer edge of the progress bar 12 and has progressed along the shaded portion as the user viewed the program. The progress indicator 58 will continue to traverse to the right as part of the progress bar 12 and provides a visual indicator for the consumer to see the current status of the movie being played.

As can be seen in FIG. 4D, the progress indicator 58 will continue to traverse to the right until it reaches the end 64 where it is then joined with the logo 48'. The time indicator 16 informs the consumer how much time has lapsed. The progress bar 12 here is the advertisement. It will be appreciated that once the progress indicator 58 reaches the end 64, an audio advertisement 59 can be performed relating to the advertiser. A consumer may also be prompted to carry out further responses such as ordering food, receiving coupons, or otherwise interacting with the advertiser. A prompt or a pop-up 61 is part of the bar 12 and integral with, and can provide the consumer with additional information, advertisements, and send a signal to a marketer's data base where it can be tracked, aggregated, and new information about a product can then be provided to the consumer. The prompt 61 could be clicked on by the consumer which causes a signal to be sent to a data base where information about the consumer is compiled so as to provide feedback to a marketer about who has visited the progress bar 12.

FIG. 5A illustrates an alternative embodiment where a progress bar is an advertisement in connection with a television 10, or other media device. The progress bar 12 includes an advertisement 66 that can include a symbol, word or tagline. With reference to both 5A and 5B, the user initiates an event such as fast forward, rewind, pause, play, etc. and the progress bar 66 first appears as an advertisement, then reconfigures into a fully functioning progress bar 12 with the design and structure of the progress bar and all its components defined by the advertisement. In this instance the morphing process resembles a bottle 72 falling into a horizontal position 68 and spilling its liquid 70 across the screen 14 to an opposing end 74, defining the outer edges of the progress bar 12. A progress indicator 76 designed as a complementing logo, traverses across the screen and is part of the progress bar 12. Once the progress indicator 76 reaches the end 74, the program is over, and the consumer has had exposure to the advertising experience generated by the progress bar as advertisement.

FIG. 5C illustrates the advertisement 66 reconfiguring during the clean up or ending stage of the user initiated event where the fluid 70 (FIG. 5B) has retracted back within the bottle 72 and the bottle has returned to an upright position. If the consumer initiates another event the bottle 72 will again fall into the horizontal position 68 and the liquid will pour out 74 once again defining the progress bar. It will be appreciated that the user initiated event can include but is not limited to play, fast forward, rewind, pause. This reconfiguration from a fully functioning progress bar 12 back into a logo 72 occurs after a pre-selected amount of time elapses after the last user action. For example, if a user initiates fast forward the bottle 66 appears and then morphs into a progress bar that is an advertisement as demonstrated in FIG. 5B. The user then hits play and if after 10 seconds the user doesn't initiate another event the spilled liquid 70 will move left across the screen 14 and back into the bottle 66. The bottle will then move back into the upright position, remain on the screen for a period, such as 3 seconds, along with an advertiser's tagline 18 and logo 72 and then disappear.

FIG. 6A illustrates an alternative embodiment to the present invention where an internet screen 80 includes a progress bar 12, video screen 81, command tabs 82 and other operational or advertising tabs 84 that include click-through features. The progress bar 12 is an advertisement 86 such as a logo for a company. After the user selects a video to watch on the internet, a video player 81 and its components begin to load, one of these components is the progress bar 12. While the video is loading, the first visual to appear on the video player 81 will be the progress bar 12, which is a logo that represents an advertiser. FIG. 6B illustrates the internet screen 80 located on a computer 88. It will be appreciated that the internet screen 80 can be located on any type of media outlet device, such as a television, touchpad, or the like. While the video is still loading and after the initial appearance of the progress bar in the form of logo 12 (FIG. 6A), the advertiser's logo 86 splits and begins morphing 90 as demonstrated in FIG. 6B. This step allows the advertisement 86 to split into components 86' and 86". The advertisement 86 can take on other configurations as it morphs 90 into a fully functioning progress bar.

FIG. 6C illustrates the progress bar 12 during the play mode where a progress indicator 92 is in the form of an advertisement, in this case a truck, and can be another symbol, and it progresses while the movie is playing. Sound indicators 94 can be incorporated within the progress bar 12 to provide a consumer with audio output and an experience in connection with the advertiser at the point in the video where the user reaches an embedded advertisement, indicated by the speed bumps 94. An example of sound for the depicted automobile manufacturer would be the sound of brakes when the truck reaches the embedded advertisement indicators. A tool bar 93 includes a pause button 96, a time completed indicator 98, a progress bar 12, a recorded time indicator 100, a closed caption feature 102, a volume control 104, a screen size control feature 106 and an option to share feature 108 for sharing the present video. The embedded advertisement indicators 92 are a component of the progress bar and are in the form of an advertisement. It can be appreciated that these indicators 92 can vary in form but will complement the advertiser being represented by the progress bar.

FIG. 6D shows the progress bar 12 in a paused video state where a pop-up 110 informs the consumer the video has been paused. During this paused state, an advertising indicia 112 is illustrated that complements the progress bar advertisement and provides yet additional branding moments for an advertiser to express itself. The consumer can depress the play tab 46 in order to start back up the video, at which time the current location indicator 92 will begin moving to the right as the video plays.

FIG. 6E depicts a state of the video playing process where the video has ended. At this stage, the progress indicator 92 can become a visual and audio experience related to the advertiser represented by the progress bar 12 indicating the end of the video. In this example the progress indicator 92 will crash into the second portion of the logo 86" and a graphic simulating a crash 114 will appear. Simultaneously a crash sound will occur, drawing the user's attention to the company represented by the progress bar. After the end of the video a quick message can appear from the advertiser of the progress bar 12 that is related to the visual and audio experience that occurs at the end of the video. In this example the advertiser may want to cite their safety ratings. The progress bar 12 in this example includes the split logo 86', 86", the progress indicator 92, and the played portion 116. The progress bar 12 is a dynamic advertisement that has an embedded, incorporated, or formed part thereof, company logo, mark, indicia, or the like 86.

FIG. 7A shows a progress bar 12 depicted at the lower portion of an internet screen on a computer 10 and it will be appreciated that the invention could be utilized with other visual output devices such as monitors, televisions, etc. A video 118 is shown being streamed via the internet to a video player screen 14 and is in full size mode where the consumer can see only the video player on the computer screen. While the video 118 is playing, the progress bar 12 is depicted and is comprised of a first portion 26, a second portion 28, a visual device for the progress indicator 32, a played portion 116, and an unplayed portion 24. The video that is being streamed 118 to the video player 14 can be an advertisement from the same company that is represented by the progress bar 12. Having a progress bar advertisement 12 complement the video advertisement 118 will bring more awareness to the advertiser's brand and message. The progress bar 12 is located in a tool bar and is shown here after the morphing process has completed and a company logo 48 has been split into separate components. Adjacent to the progress bar 12 and in the tool bar are other components such as the pause button 120, a volume control 104, a time indicator 16, or an operational control feature 122. These components are separate from the progress bar 12.

FIG. 7B shows the progress bar 12 morphing into a company logo just before disappearing off the screen while a video is playing in full screen mode. When a user decides to watch a streamed video on the internet they can select to watch it in minimized screen mode or in full screen mode. When a user selects full screen mode it is common for the website that streams the video to include their progress bar on the lower portion of that screen. If the user takes no action other than watching the video, the website streaming the video will often times have the progress bar disappear after a preselected period of time elapses. Before disappearing, our progress bar 12 will morph from being a full size progress bar that is an advertisement into a company logo. In this situation, the first portion 26 and the second portion 28 are moving in from their outer ends 52 and the played portion 116 of the progress bar is disposed therebetween. In FIG. 7D the progress bar 12 has reconfigured itself back into a reset position 124 whereby a company logo 48 can be positioned on the output screen 14 of the computer screen 10 or other media device. After a preselected amount of time the logo will disappear. It will be appreciated that the logo 48 can change and can be a logo of another company that may be sponsoring the next video that is to be played which may be more relevant to the user. Thus, the video playing process with a progress bar 12 as just described can be repeated thus allowing other advertisers to have their logo 48 be displayed and become the progress bar 12. Thus, the present invention contemplates a repeatable process whereby different streaming content is played back on a visual device, different progress bars 12 can be depicted that demonstrate other company logos 48.

FIG. 7C depicts a screen during a video playing mode where a progress bar 12 has reconfigured into a company logo 48. This step shows an optional configuration where the progress bar 12 has completed its collapse after a preselected amount of time and is not spread out as was depicted in the FIG. 7A video playing mode. A benefit of the progress bar 12 being in its collapsed rendition as shown in FIG. 7C, is that it takes up less room on the bottom of the screen and it also provides the consumer with the option of not being visually distracted by a progress bar 12 as depicted in FIG. 7A. An additional benefit to having the progress bar 12 reconfigure into a company logo 48 is increased brand exposure for the advertiser. Thus, the progress bar 12 is flexible and can be depicted in a laid open format as shown in FIG. 7A, or shown in a condensed format as shown in FIG. 7C.

FIGS. 7A-7D demonstrate a progress bar that is an advertisement morphing into a company logo before it disappears off the video player screen. If the user takes action and slides the mouse it is common for websites that stream videos to have their progress bar reappear on the lower portion of the screen when a video is in full screen mode. When the user takes such action the progress bar that is an advertisement as pictured in 7D will appear in a reset position 124 as a company logo 48. It will then slide to a neutral position as in FIG. 7C and then morph (7B in reverse) into a progress bar that is an advertisement 12 on 7A.

FIG. 8A shows a progress bar 12 on a television 10 or other output device, during a rewind or fast forward mode 126. A progress bar 12 includes a first portion 26 and a second portion 28, a visual device as a current location indicator 32, a recorded portion 116 and an unrecorded portion 24. In this particular embodiment the progress bar advertising logo 48 is a crayon box which is depicted as the first portion 26. The visual device indicating the progress indicator 32 is a crayon that has escaped from the crayon box and is shown as a part of the progress bar 12. The shaded portion 128 is indicated and allows a consumer to see how much of the video has been recorded. FIG. 8A represents another embodiment of the invention in rewind/fast forward mode.

With reference to FIG. 8B, the progress bar has reset and now appears in the shape of a logo 48. Along with the logo 48, advertising indicia 18 such as a tagline could be provided that is associated with an advertiser. As shown in FIG. 8B, the progress bar 12 depicts a situation where a program has resumed at normal speed after the user initiated FF/RW has completed. Thus, FIGS. 8A and 8B depict a situation where a live television show is playing and the consumer initiated a fast forwarding of the program. After the user initiated the playing of the program at a normal speed the progress bar was no longer needed on the screen and it morphed back into just an advertising indicia 48 before disappearing off the screen. If the consumer would like to rewind the program then she could proceed through these steps as described above in FIG. 8A wherein the progress bar 12 would morph into a progress bar that is an advertisement as shown.

FIG. 9A illustrates an alternative embodiment of the present invention that could be enjoyed while a consumer is watching television. The television 10 has a screen 14 in pause mode 132. At this point in the process the progress bar 12 appears in a static mode with the logo 48 being visually depicted. Immediately after a user presses the pause button on an external remote control device (not shown) the advertiser's logo 48 appears. It is the first display the user sees. That logo without delay then automatically reconfigures into a progress bar 12 as seen in 9B. The pause mode 134 causes to be promptly displayed a split progress bar 12 with a first portion 26, a second portion 28, a pause button 120, a visual device 32, such as a vehicle, a played portion 116, and a task bar 136. During the pause mode 134, the task bar 136 is present and provides a consumer with options such as to minimize logo bar 138, move logo bar 140, go to Ford Experience 142, or experience promos 144. For the consumer to enjoy one of these options in the task bar 136, the consumer may manipulate the remote control by highlighting and then selecting one of the aforementioned options. The minimized logo bar 138, once depressed, effectuates minimizing the progress bar 12 back into just a logo. The move logo bar 140 function allows a consumer to move the progress bar 12 to another location on a screen 14. The screen 14 has been shown as a partial view on the television 10 but it will be appreciated that the progress bar 12 could be moved to other locations on the screen 14, including being rotated 90° and moved vertically along a side of the screen 14. The go to Ford Experience 142 option allows the consumer, during the pause mode 134, to learn more about the advertiser. For example, the consumer could interact with the progress bar 12 and receive information from the advertiser either live via streaming content, or through follow up opportunities by mail, electronic media, or otherwise. The promos tab 144 allows a consumer to receive coupons or other promotional materials from the advertiser which could pop up on the screen (not shown), and be sent to a consumer once a consumer profile has been generated which could be an option underneath this tab, or simply be another visual indicator such as visual device 32 that can relay a message to a consumer. Thus, the progress bar 12 provides an interactive experience for the consumer as well as a methodology for providing a company logo as the progress bar.

Figure 9C:
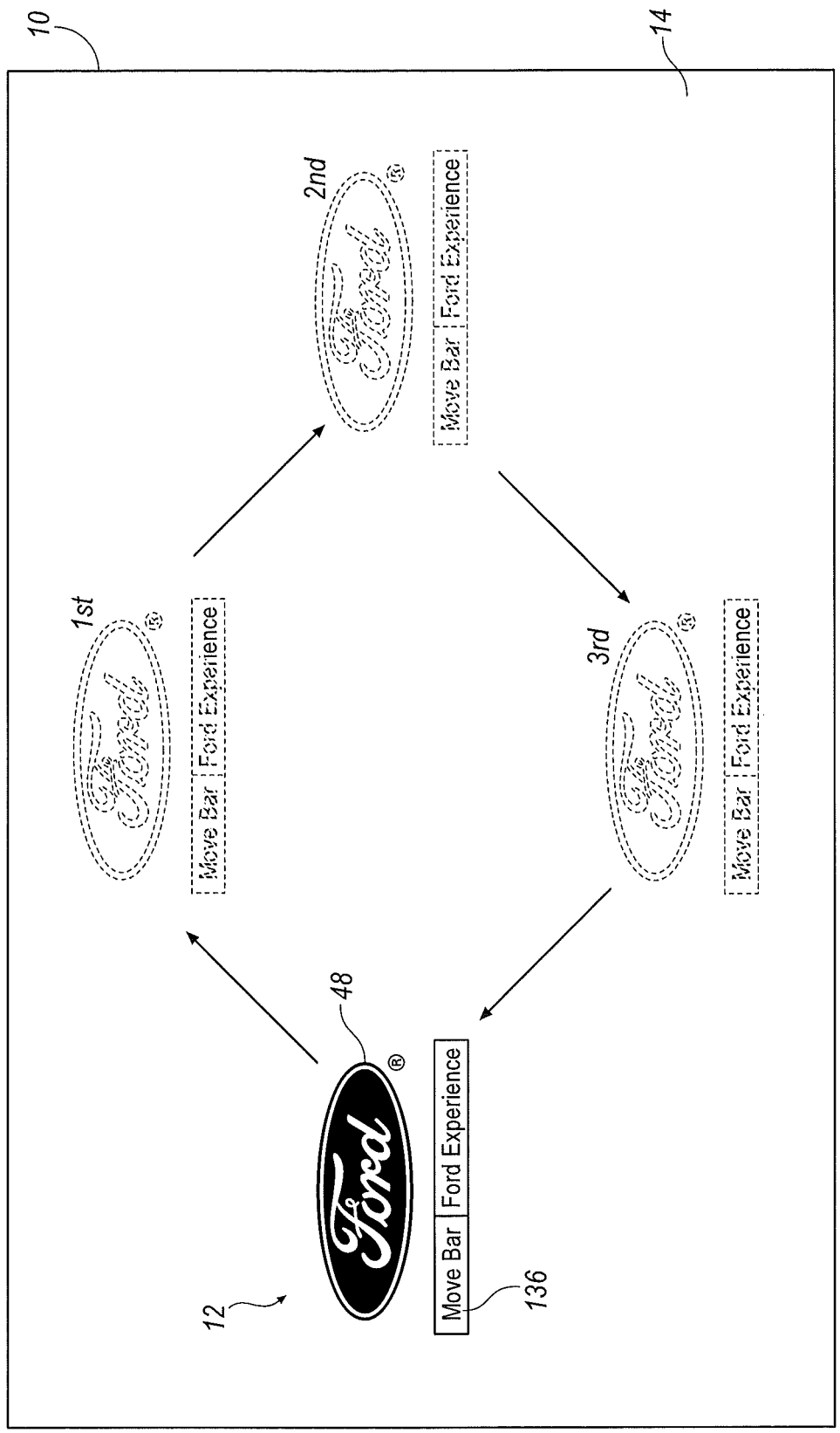
FIG. 9C shows a progress bar in pause mode, showing the bar locatable at various locations on a visual screen.

FIG. 9C depicts an alternative arrangement where a television 10 could have a progress bar 12 with a logo 48 that could be selectively repositioned around the screen 14. As shown in solid, a progress bar 12 could have a task bar 136 associated with a logo 48. The consumer could utilize her remote control and reposition the progress bar to a first, second, or third position. The phantom representations illustrate said positions and it will be appreciated that the consumer could be provided with the flexibility to move the progress bar 12 to other desired locations on the screen 14.

FIG. 9D illustrates the Ad Skip mode 146 that a consumer could enjoy while watching television. It will be appreciated that the Ad Skip mode 146 can be used in internet applications as well. The cable box is able to recognize an embedded commercial by a change in lighting and sound. Once the embedded commercial is recognized the advertiser's logo 48 appears as a progress bar 12 along with a task bar 136. The task bar 136 includes various tabs, including but not limited to an ad skip tab 148, a Ford Experience tab 142, a Ford Promo tab 144, and a Move Logo Bar tab 140. It will be appreciated that a marketer could include tabs in a task bar 136 that have other features and terminology that may be tailor fit to a marketer's desires. If the ad skip tab 146 is depressed, the cable box will automatically fast forward through the embedded commercial and then once it recognizes through a change in sound and light that the program has resumed it will stop fast forwarding and resume playing the program. All the while the progress bar 12 will be present as an advertiser's logo 48. After the program resumes the progress bar 12 will disappear after a selected amount of time. The consumer is given the opportunity to direct the cable box to coordinate the skipping of the networks advertisements. The logo 48 could remain constant as depicted in FIG. 9D, or the logo 48 could consume the entirety of the television screen 14 during the time period the commercial is being fast forwarded through. After the commercial has completed, the regularly scheduled program may reappear with the sound adjusting accordingly. Thus, the progress bar 12 includes a means for detecting an advertisement, then controlling the visual and sound of the commercial, and then once the commercial(s) have completed, then allow the regularly scheduled television program to resume without further consumer effort. Thus, a programmable Ad Skip function is contemplated which provides the consumer with flexibility to control her experience, through the progress bar 12, when commercials are present.

Figure 10:
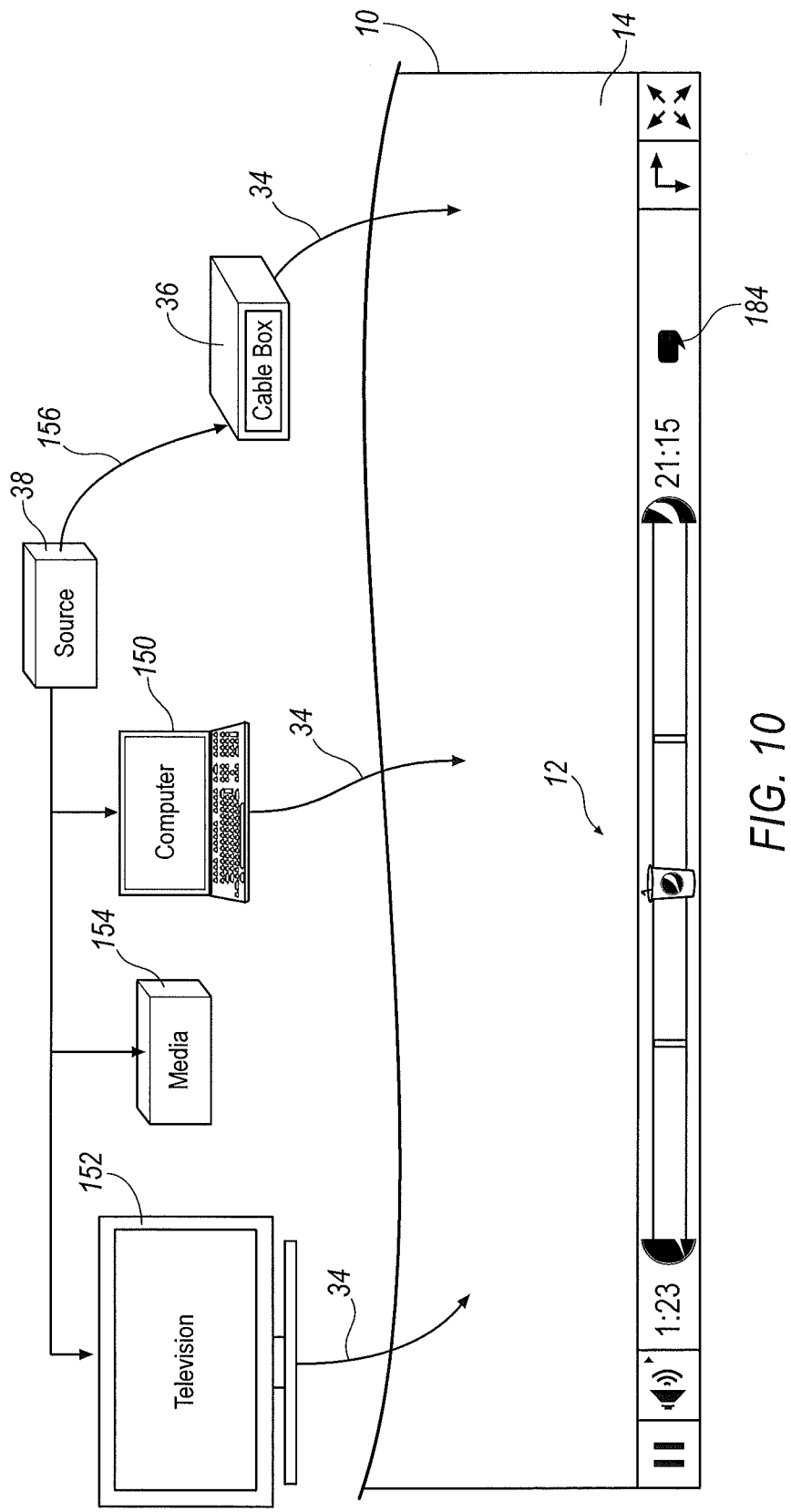

FIG. 10 illustrates a schematic diagram of an arrangement where a television 10 or other digital output device, may receive signals from an exterior source 38. For example, the digital output device 10 has a screen 14 that could receive signals 34 from a cable box 36. The signals 34 provide content to the screen 14 which also propagates the progress bar 12 to present its predetermined content.

It will be appreciated that a computer 150, or a primary television 152, or other media device 154 could provide signals 134 to the output device 10 and power the progress bar 12, instead of the cable box 36. An exterior signal source 38, such as satellite, the internet, or other digital/analog provider, feeds signals 156 downstream to associated hardware 36, 150, 152, 154, or the like. It will be further appreciated that the progress bar 12 can be delivered to an output device via various sources and should not be limited to those described herein.

FIG. 11 is a flow chart illustrating the process of implementing the progress bar indicia during the user-initiated multi-second RW/FF mode. With continued reference to FIG. 11, this process includes the consumer pressing 160 the automatic multi-second RW/FF button on a remote control that is not pictured to initiate the automatic multi-second RW/FF process. As automatic RW/FF begins, the progress bar indicia 162 appears in the bottom corner of the screen along with a complementary tune that could be selected by an advertiser. It will be appreciated that an advertiser may not desire to utilize a tune and thus that component could be left out of this process. The advertisement includes the logo 48 that may or may not split or morph at this time. The next step 163 then is for the program to FF/RW and then automatically resume playing. After the automatic multi-second RW/FF process is complete the program resumes and the ad may remain 164 for an adjustable time period before disappearing. The automatic multi-second RW/FF mode 126 exposes the consumer to advertising indicia during the process.

FIG. 12 shows a flow chart of a method of operating 170 a progress bar as an advertisement as was illustrated in the previously discussed FIGS. 6A and 7A-D. It will be appreciated that this method of operating the present invention may include the following steps, but may be altered to have fewer or more steps in the process. The method of a consumer operating 170 a progress bar that is an advertisement (FIG. 6A) includes the step of a consumer selecting media 172 that is to be streamed and viewed on a device. The media content could be music, video, or other digital content. For discussion purposes, the media content is a video streamed via the internet and the device can be a computer.

The next step includes video being streamed 174, and player components begin to appear on a device. Those video player components could include a status logo 86 (FIG. 6A) or a progress bar 12 (FIG. 6A). At this point the logo and the progress bar could be the same feature. Next, a progress bar appears as an advertiser's logo 90 (FIG. 6B) near the bottom of a screen where it then morphs into a progress bar with components in the form of advertising indicia. The full visuals for the progress bar are now visible for the consumer engaging them in an advertising experience. The user is then given the opportunity to expand the screen to full size 178 (FIG. 6C) or the step of allowing the video to begin to play in the smaller screen function where the video begins to play 180. If the consumer expands to full screen size 178, the progress bar 12 remains on the bottom 182 (FIG. 7A) of the computer screen for a predetermined time that may be selected by a network. The bar may then disappear and may not reappear until an event, for example a commercial break or a user moving the mouse over the screen, is sensed. The method of operating 170 includes an ad indicator 184, 186 that is operable to sense when a commercial break begins and terminates. As an embedded commercial break 94 (FIG. 6C) is reached, the ad indicator 184, 186 makes a sound that is related to the advertisement. The advertisement is separate from the embedded commercial break that is from a network, but it can be related. The ad is associated with the progress bar 12 and can override the commercial break from the network. The ad begins to play and once it is complete, the show resumes. After the show resumes in full screen mode, a predetermined amount of time elapses 188 and the progress bar morphs back into an original advertising logo, and then disappears after a predetermined time period.

If the consumer does not expand the screen to full size as shown in step 178, then step 180 will begin where the video begins to play and a current status indicator or a visual device 92 (FIG. 6C) which is in the form of an advertisement, will move across the progress bar 12. The progress bar 12, can be from the same advertiser as advertising indicia (FIG. 6D) or banner ads that appear on the screen 80. It is suggested that complementing these ads may increase click-through rates and improve consumer recall of advertisements and or consumer products.

While the video continues to play, a commercial break may be reached. The advertising indicator 92 (FIG. 6C) responds and makes a sound 94 that may be commensurate with a jingle, or other similar sound, associated with a marketer. After the sound or jingle is complete the marketer's advertisement will begin to play. Once the advertisement has completed, the regularly scheduled show will resume. Thus, the present invention contemplates a method of advertising wherein an embedded commercial break from a network, cable station, tape recording, or the like, will be suppressed once it is sensed. Once it is sensed, a desired ad will be played. In this instance the logo bar is not meant to replace embedded advertisements but rather complement. However, it is not limited to complementing embedded advertisements.

The next step 190 has the progress bar 12 remaining until the video or other content ends. Once the media content has stopped streaming over the device, the progress bar 12 morphs back into its original state which was a logo 48 (FIG. 7D). A sound relevant to the advertiser may then be generated.

It will be appreciated that the method of operating an advertising progress bar 170 may include other steps and can be modified to a marketer's desire.

Figure 13:
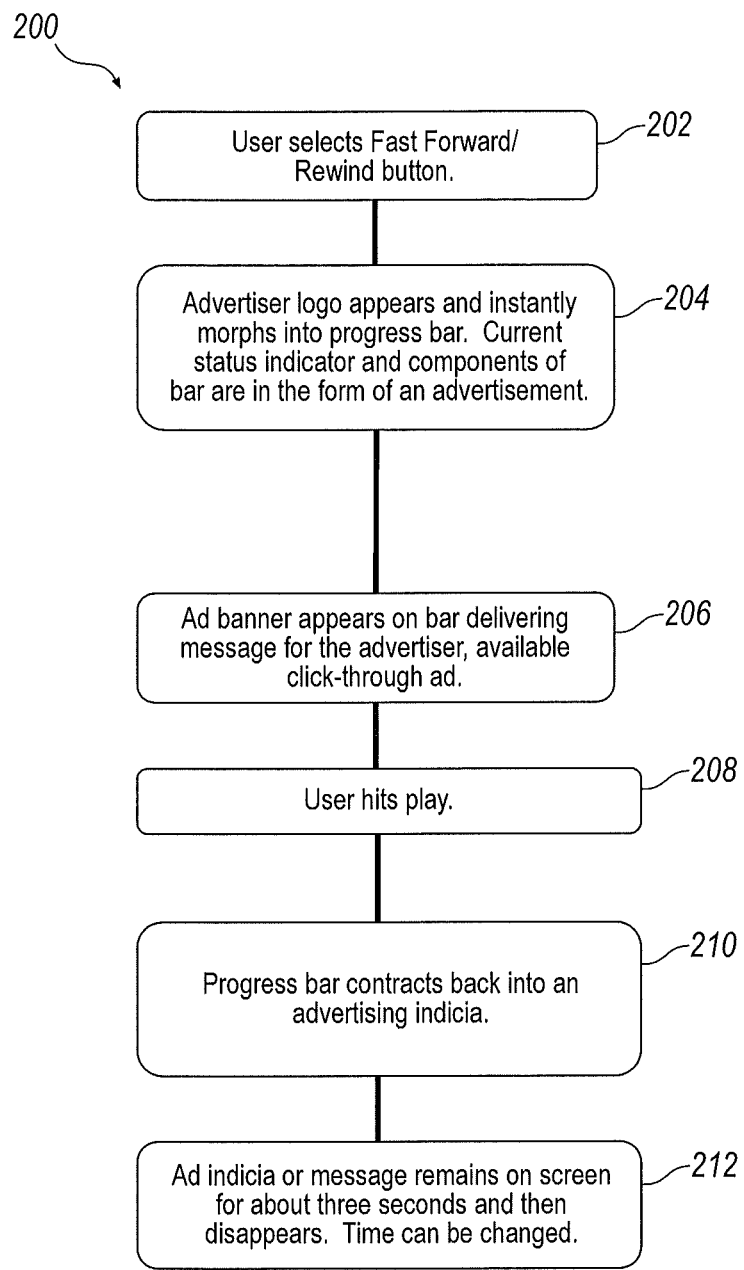
FIG. 13 shows a flow chart of the method for using a progress bar in the fast forward or rewind mode for television.

FIG. 13 illustrates a flow chart of a method of operating the progress bar 12 while in the fast forward/rewind mode 200. FIGS. 8A-8B demonstrate the steps that are shown in the flow chart depicted in FIG. 13. Here a logo bar is on a television but it will be appreciated that the bar can be used on other media devices. In this mode 200, the user selects the fast forward or rewind button 202. Once this event has been detected, an advertising logo appears 204 and then morphs into a progress bar. The progress bar 12 (FIG. 8A) includes a current status indicator 32 (FIG. 8A) and other components of the bar appear in the form of an advertisement including features 26, 28, and 32. It will be appreciated that the method shown in flow chart 200 is different than the flow chart 126 in that the flow chart 200 shows a fast forward or rewind button mode situation where the advertiser logo 48 (FIG. 8B) morphs into a progress bar 12.

The next step includes an ad banner appearing 206 on a progress bar that is operable to deliver a message for an advertiser 18 (FIG. 8B). A consumer could click through the ad by selecting the click-through ad button.

Once the consumer has fast forwarded or rewound to a desired position, the user can then hit play 208 where the media content, such as a movie, resumes. At this step, the progress bar contracts 210 back into its original configuration where it appears as an advertising indicia, or logo 48 (FIG. 8B). The advertising indicia may remain 212 on a screen 14 for a predetermined time period whereupon it disappears.

It will be appreciated that the aforementioned method of operating during a fast forward or rewind mode 200 can be modified to include additional steps, or fewer steps.

With reference to FIG. 14, a method of operating an advertising skip function 220 is depicted in a flow chart. The advertising skip function 220 may be desirable to engage when and if a consumer desires not to listen to a commercial advertisement from a network that might be embedded within a program that is being streamed. To help illustrate FIG. 14, FIG. 9D will be referenced. The method of operating the advertising skip function 220 includes the step of first detecting when that ad begins 222 which can be accomplished by an advertising indicator 184 sensing an altered condition. Typically, volume and/or lighting will change for advertisement breaks, allowing an external sensing device to recognize the interruption to the program 224. When an interruption is recognized, the progress bar 12 advertisement will appear (FIG. 9D).

Next, the advertising indicia or logo 48 (FIG. 9D) morphs 226 into a progress bar 12. The framework and structure of the progress bar are components that can be unique to the advertiser's desired brand. The next step includes a banner or task bar 136 (FIG. 9D) appearing that gives a user four different options. These options have been depicted in FIG. 9D and include the option of ad skip 148, providing an advertiser experience 142, providing an advertiser promotional opportunity 144, or to move the logo bar to a different location on the screen 140. If the user takes no action after a selected period of time, the progress bar will morph back into the advertising indicia or logo 48 and will disappear after a predetermined period of time.

With regard to the advertiser experience option 142 (FIG. 9D), a consumer may select this tab and learn more about the product that she is interested in through an interactive online experience. Similarly, if the consumer selects the advertiser promos tab 144, they may receive via email, mail, or personal delivery, a promotional item. By selecting the advertising promotional tab 144 a consumer could instantly order a pizza, or a consumer product, from a local establishment which in turn could deliver a food or other product in a short time period. It is contemplated that the advertising promo tab 144 could be interactive to allow a consumer to pay for products online and have those products delivered. Thus, the progress bar 12 includes interactive features that allow a consumer to engage in an experience with an advertiser, as well as order and pay for products which could be delivered.

Referring back again to the advertiser experience tab 142, the user could be taken into a separate interactive ad screen 230. During this time period, the streaming video content could remain paused and the consumer would be able to resume playing when they choose to do so. To do this, the user then hits play 232 and the progress bar morphs 234 back into the prior logo 48 (FIG. 9D) which in turn remains on the screen for a predetermined period while play resumes.

It will be appreciated that the advertising skip feature 220 can include other steps without departing from the scope of the present invention.

It will be appreciated that the aforementioned process and devices may be modified to have some steps removed, or may have additional steps added, all of which are deemed to be within the spirit of the present invention. Even though the present invention has been described in detail with reference to specific embodiments, it will be appreciated that various modifications and changes can be made to these embodiments without departing from the scope of the present invention as set forth in the claims. Accordingly, the specification and the drawings are to be regarded as an illustrative thought instead of merely a restrictive thought of the scope of the present invention.

What is claimed as new and desired to be protected by Letters Patent of the United States is:

1. A method of generating advertising revenue by using a progress bar that is an advertisement and is displayed on a streaming media device, the method comprising the steps of:
   providing a progress bar and showing the play status of user activated streaming media that can be experienced on a streaming media device, the progress bar is an advertising indicia that shows the status of played and unplayed portions of streaming media, the progress bar further has an indicator member that advances to show current location of a play status of the streaming media; and
   morphing the progress bar from a logo to at least a first portion so that the logo becomes at least one component of the progress bar.

2. The method of generating advertising revenue as claimed in claim 1, further comprising the steps of providing an exterior signal source for providing the streaming media to the streaming media device.

3. The method of generating advertising revenue as claimed in claim 1, further comprising the step of skipping advertisements that may be embedded in the streaming media.

4. The method of generating advertising revenue as claimed in claim 1, further comprising the step of providing messages to a consumer about consumer goods or services that pertain to the logo in a morphed progress bar.

5. The method of generating advertising revenue as claimed in claim 1, further comprising the step of providing promotional indicia that invites a consumer to buy goods or services.

6. The method of generating advertising revenue as claimed in claim 5, wherein the consumer interacts with the streaming media device to buy goods or services.

7. The method of generating advertising revenue as claimed in claim 1, further comprising the step of moving the progress bar to alternative locations on the streaming media device.

8. The method of generating advertising revenue as claimed in claim 1, further comprising the step of the progress bar reconfiguring or morphing into an original configuration upon determination of an event.

9. The method of generating advertising revenue as claimed in claim 1, further comprising the step of operating a play, fast forward, rewind, or pause function, and thereafter the progress bar morphs back into the logo.

10. The method of generating advertising revenue as claimed in claim 1, further comprising the step of providing a media source that provides signals to the streaming media device.

11. The method of generating advertising revenue as claimed in claim 1, further comprising the step of the logo reconfiguring from the at least first portion and a second portion, said portions are apart from one another, said first and second portions are operable to become one upon a predetermined event.

12. The method of generating advertising revenue as claimed in claim 1, wherein the streaming media device is a television, a media device, a computer, or a cable box.

13. The method of generating advertising revenue as claimed in claim 1, wherein the indication of the current location in playback of the streaming media includes the step of providing an indicator member that has a visual representation that is associated with the logo.

14. The method of generating advertising revenue as claimed in claim 1, wherein the logo is one of a brand, symbol, indicia, icon, or name.

15. The method of generating advertising revenue as claimed in claim 1, further comprising morphing the logo to at least a second portion of the logo so that it is positioned at another end of the progress bar, and morphing the first portion of the logo and the second portion of the logo back to an original configuration of the logo after a step of operating a play, fast forward, rewind, or pause function is complete.

16. The method of generating advertising revenue as claimed in claim 1, wherein the streaming media includes one of a live streaming content, a video on demand, or a previously recorded content from a media source that is streamed over the internet.

17. The method of generating advertising revenue as claimed in claim 1, wherein the streaming media includes one of a live streaming content, a video on demand, and a previously recorded content from the media source that is streamed from one of a website and a cable box.

18. The method of generating advertising revenue as claimed in claim 1, wherein the indicator member is an advertisement.

19. An advertising system for increasing brand exposure that can be used with an electronic media device, comprising:
   an electronic media device having a display;
   a progress bar depicted on the display, the progress bar includes a logo, the progress bar depicts a first portion that indicates what has loaded of a streaming media, the progress bar further depicts a second portion of streaming media that has not yet loaded; and
   a media source providing an input signal to the electronic media device, the media source providing the logo that transitions to or from separate components of the progress bar while the streaming media is played.

20. The advertising system as claimed in claim 19, wherein the progress bar further includes an indicator for showing the play status of an event, said indicator appears as the logo.

21. The advertising system as claimed in claim 19, wherein the progress bar changes appearance while continuously depicting the logo.

22. The advertising system as claimed in claim 19, wherein the progress bar is a moving company advertisement.

23. The advertising system as claimed in claim 19, wherein the electronic media device is a television, computer screen, computer tablet, PDA or phone.

24. The advertising system as claimed in claim 19, further comprising a progress indicator that indicates a level of a loaded portion of the streaming media, wherein the progress indicator is associated with the logo.

25. The advertising system as claimed in claim 19, wherein the logo is a company logo that includes one of a brand, symbol, indicia, icon, or name.

26. The advertising system as claimed in claim 19, wherein the streaming media includes one of a live streaming content, a video on demand, or a previously recorded content from the media source.

* * * * *